US011921240B2

United States Patent
Chen et al.

(10) Patent No.: US 11,921,240 B2
(45) Date of Patent: Mar. 5, 2024

(54) SYMMETRIC RECEIVER SWITCH FOR ULTRASOUND DEVICES

(71) Applicant: BFLY OPERATIONS, INC., Guilford, CT (US)

(72) Inventors: Kailiang Chen, Branford, CT (US); Daniel Rea McMahill, Woodstock, GA (US); Joseph Lutsky, Los Altos, CA (US); Keith G. Fife, Palo Alto, CA (US); Nevada J. Sanchez, Guilford, CT (US)

(73) Assignee: BFLY OPERATIONS, INC., Burlington, MA (US)

( * ) Notice: Subject to any disclaimer, the term of this patent is extended or adjusted under 35 U.S.C. 154(b) by 755 days.

(21) Appl. No.: 17/025,927

(22) Filed: Sep. 18, 2020

(65) Prior Publication Data
US 2021/0088638 A1    Mar. 25, 2021

Related U.S. Application Data

(60) Provisional application No. 62/902,769, filed on Sep. 19, 2019.

(51) Int. Cl.
*G01S 7/52* (2006.01)

(52) U.S. Cl.
CPC ...... *G01S 7/52025* (2013.01); *G01S 7/52017* (2013.01); *G01S 7/5202* (2013.01); *G01S 7/52022* (2013.01); *G01S 7/52085* (2013.01)

(58) Field of Classification Search
CPC ............. G01S 7/52025; G01S 7/52022; G01S 7/52085; G01S 7/5202; H03K 17/6874; H03K 17/10; H03K 17/102; H03K 17/687
See application file for complete search history.

(56) References Cited

U.S. PATENT DOCUMENTS

| 5,841,693 A | 11/1998 | Tsukiji |
| 6,241,676 B1 | 6/2001 | Savord |

(Continued)

FOREIGN PATENT DOCUMENTS

| EP | 3157170 A1 | 4/2017 |
| JP | S61-69212 A | 4/1986 |

(Continued)

OTHER PUBLICATIONS

PCT/US2020/051453, Sep. 18, 2020, International Search Report and Written Opinion.

(Continued)

*Primary Examiner* — Helen C Kwok

(74) *Attorney, Agent, or Firm* — Osha Bergman Watanabe & Burton LLP

(57) ABSTRACT

Circuitry for an ultrasound device is described. The ultrasound device may include a symmetric switch positioned between a pulser and an ultrasound transducer. The pulser may produce bipolar pulses. The symmetric switch may selectively isolate a receiver from the pulser and the ultrasound transducer during a transmit mode of the device, when the bipolar pulses are provided by the pulser to the ultrasound transducer for transmission, and may selectively permit the receiver to receive signals from the ultrasound transducer during a receive mode. The symmetric switch may be provided with a well switch to remove well capacitances in a signal path of the device.

20 Claims, 18 Drawing Sheets

(56) References Cited

U.S. PATENT DOCUMENTS

| | | | |
|---|---|---|---|
| 6,759,888 B1* | 7/2004 | Wodnicki | H03K 17/6874 |
| | | | 327/434 |
| 7,313,053 B2 | 12/2007 | Wodnicki | |
| 7,549,961 B1 | 6/2009 | Hwang | |
| 7,775,979 B2 | 8/2010 | Thomenius et al. | |
| 7,883,466 B2 | 2/2011 | Adachi et al. | |
| 8,298,144 B2 | 10/2012 | Burcher | |
| 8,327,521 B2 | 12/2012 | Dirksen et al. | |
| 8,852,103 B2 | 10/2014 | Rothberg et al. | |
| 9,229,097 B2 | 1/2016 | Rothberg et al. | |
| 9,327,142 B2 | 5/2016 | Rothberg et al. | |
| 9,351,706 B2 | 5/2016 | Rothberg et al. | |
| 9,473,136 B1 | 10/2016 | Chen et al. | |
| 9,492,144 B1 | 11/2016 | Chen et al. | |
| 9,705,518 B2 | 7/2017 | Chen et al. | |
| 9,778,348 B1* | 10/2017 | Chen | G01S 15/8915 |
| 9,933,516 B2 | 4/2018 | Chen et al. | |
| 9,958,537 B2 | 5/2018 | Chen et al. | |
| 9,987,661 B2 | 6/2018 | Alie et al. | |
| 10,014,871 B2 | 7/2018 | Chen et al. | |
| 10,082,488 B2 | 9/2018 | Chen et al. | |
| 10,082,565 B2 | 9/2018 | Chen et al. | |
| 10,094,917 B2 | 10/2018 | Chen et al. | |
| 10,175,347 B2 | 1/2019 | Chen et al. | |
| 10,187,020 B2 | 1/2019 | Chen et al. | |
| 10,231,713 B2 | 3/2019 | Chen et al. | |
| 10,272,471 B2 | 4/2019 | Alie et al. | |
| 10,277,236 B2 | 4/2019 | Chen et al. | |
| 10,340,866 B2 | 7/2019 | Singh et al. | |
| 10,340,867 B2 | 7/2019 | Singh et al. | |
| 10,398,414 B2 | 9/2019 | Chen et al. | |
| 10,707,886 B2 | 7/2020 | Chen et al. | |
| 2003/0097071 A1 | 5/2003 | Halmann et al. | |
| 2003/0109235 A1* | 6/2003 | Veillette | H04B 1/48 |
| | | | 455/134 |
| 2005/0007879 A1 | 1/2005 | Nishida | |
| 2005/0131297 A1 | 6/2005 | Nishigaki et al. | |
| 2005/0146371 A1* | 7/2005 | Wodnicki | H03K 17/6874 |
| | | | 327/434 |
| 2005/0154300 A1 | 7/2005 | Wodnicki et al. | |
| 2005/0171431 A1 | 8/2005 | Petersen | |
| 2006/0012400 A1 | 1/2006 | Sugawara | |
| 2006/0058588 A1 | 3/2006 | Zdeblick | |
| 2006/0079778 A1 | 4/2006 | Mo et al. | |
| 2007/0016026 A1 | 1/2007 | Thomenius et al. | |
| 2007/0083119 A1 | 4/2007 | Adachi et al. | |
| 2007/0242567 A1 | 10/2007 | Daft et al. | |
| 2008/0021327 A1 | 1/2008 | El-Bialy et al. | |
| 2008/0238532 A1 | 10/2008 | Hanazawa et al. | |
| 2008/0264171 A1* | 10/2008 | Wodnicki | A61B 8/00 |
| | | | 73/632 |
| 2008/0283889 A1 | 11/2008 | Haraguchi et al. | |
| 2009/0096489 A1 | 4/2009 | Ying et al. | |
| 2009/0182233 A1 | 7/2009 | Wodnicki | |
| 2009/0250729 A1 | 10/2009 | Lemmerhirt et al. | |
| 2010/0152587 A1 | 6/2010 | Haider et al. | |
| 2010/0270026 A1 | 10/2010 | Lazaratos et al. | |
| 2010/0315272 A1 | 12/2010 | Steele et al. | |
| 2010/0317972 A1 | 12/2010 | Baumgartner et al. | |
| 2011/0055447 A1 | 3/2011 | Costa | |
| 2011/0060225 A1 | 3/2011 | Cogan | |
| 2012/0108963 A1 | 5/2012 | Hara et al. | |
| 2012/0249210 A1* | 10/2012 | Shimizu | G01S 7/52017 |
| | | | 327/333 |
| 2013/0047695 A1 | 2/2013 | Drachmann | |
| 2013/0207113 A1 | 8/2013 | Tsai et al. | |
| 2014/0145781 A1* | 5/2014 | Taylor | G01S 7/52025 |
| | | | 327/427 |
| 2014/0243614 A1 | 8/2014 | Rothberg et al. | |
| 2014/0288428 A1 | 9/2014 | Rothberg et al. | |
| 2015/0032002 A1 | 1/2015 | Rothberg et al. | |
| 2015/0087990 A1* | 3/2015 | Honda | H03K 17/0822 |
| | | | 600/459 |
| 2015/0087991 A1 | 3/2015 | Chen et al. | |
| 2015/0109057 A1 | 4/2015 | Rouat | |
| 2015/0297193 A1 | 10/2015 | Rothberg et al. | |
| 2015/0340023 A1 | 11/2015 | Hemmsen et al. | |
| 2016/0043720 A1* | 2/2016 | Kubota | H03K 17/6874 |
| | | | 327/109 |
| 2016/0076933 A1 | 3/2016 | Leone et al. | |
| 2016/0207760 A1 | 7/2016 | Rothberg et al. | |
| 2016/0331353 A1 | 11/2016 | Ralston et al. | |
| 2017/0104481 A1 | 4/2017 | Ko et al. | |
| 2017/0126221 A1* | 5/2017 | Hayashi | H01L 23/5283 |
| 2017/0157646 A1 | 6/2017 | Alie et al. | |
| 2017/0160239 A1 | 6/2017 | Chen et al. | |
| 2017/0160387 A1 | 6/2017 | Chen et al. | |
| 2017/0160388 A1 | 6/2017 | Chen et al. | |
| 2017/0163225 A1 | 6/2017 | Chen et al. | |
| 2017/0163276 A1 | 6/2017 | Chen et al. | |
| 2017/0188996 A1* | 7/2017 | Kajiyama | A61B 8/5207 |
| 2017/0264307 A1 | 9/2017 | Chen et al. | |
| 2017/0281138 A1 | 10/2017 | Bao et al. | |
| 2017/0285150 A1 | 10/2017 | Chen et al. | |
| 2017/0285152 A1 | 10/2017 | Bao et al. | |
| 2017/0285155 A1 | 10/2017 | Chen et al. | |
| 2017/0307739 A1 | 10/2017 | Chen et al. | |
| 2017/0322293 A1 | 11/2017 | Chen et al. | |
| 2018/0070925 A1 | 3/2018 | Chen et al. | |
| 2018/0210073 A1 | 7/2018 | Chen et al. | |
| 2018/0262200 A1 | 9/2018 | Chen et al. | |
| 2018/0321365 A1 | 11/2018 | Chen et al. | |
| 2018/0353995 A1 | 12/2018 | Alie et al. | |
| 2018/0360426 A1 | 12/2018 | Singh et al. | |
| 2018/0361431 A1 | 12/2018 | Singh et al. | |
| 2018/0364200 A1 | 12/2018 | Chen et al. | |
| 2018/0364342 A1 | 12/2018 | Chen et al. | |
| 2018/0367110 A1 | 12/2018 | Singh et al. | |
| 2018/0367111 A1 | 12/2018 | Singh et al. | |
| 2018/0376253 A1 | 12/2018 | Lutsky et al. | |
| 2019/0000422 A1 | 1/2019 | West et al. | |
| 2019/0001159 A1 | 1/2019 | Chen et al. | |
| 2019/0069842 A1 | 3/2019 | Rothberg et al. | |
| 2019/0086525 A1 | 3/2019 | Chen et al. | |
| 2019/0140603 A1 | 5/2019 | Chen et al. | |
| 2019/0142387 A1 | 5/2019 | Chen et al. | |
| 2019/0142389 A1 | 5/2019 | Singh et al. | |
| 2019/0142391 A1 | 5/2019 | Bao et al. | |
| 2019/0142393 A1 | 5/2019 | Chen et al. | |
| 2019/0149109 A1 | 5/2019 | Singh et al. | |
| 2019/0149110 A1 | 5/2019 | Singh et al. | |
| 2019/0253061 A1 | 8/2019 | Chen et al. | |
| 2019/0261954 A1 | 8/2019 | Chen et al. | |
| 2019/0261955 A1 | 8/2019 | Chen et al. | |
| 2019/0282207 A1 | 9/2019 | Chen et al. | |
| 2019/0299251 A1 | 10/2019 | Chen et al. | |
| 2019/0336111 A1 | 11/2019 | Chen et al. | |
| 2020/0150252 A1 | 5/2020 | Chen et al. | |

FOREIGN PATENT DOCUMENTS

| | | |
|---|---|---|
| JP | S62-240032 A | 10/1987 |
| JP | H09-074345 A | 3/1997 |
| JP | 2008-272471 A | 11/2008 |
| JP | 2015-012668 A | 1/2015 |
| JP | 2015-097460 A | 5/2015 |
| TW | 201417505 A | 5/2014 |
| WO | WO 2009/135255 A1 | 11/2009 |
| WO | WO 2015/189982 A1 | 12/2015 |
| WO | WO 2016/057622 A1 | 4/2016 |
| WO | WO 2016/057631 A1 | 4/2016 |

OTHER PUBLICATIONS

Chen et al., Ultrasonic Imaging Transceiver Design for CMUT: A Three-Level 30-Vpp Pulse-Shaping Pulser With Improved Efficiency and a Noise-Optimized Receiver. IEEE Journal of Solid-State Circuits. Nov. 2013; 48(11): 2734-2745.

International Search Report and Written Opinion dated Jan. 4, 2021 in connection with International Application No. PCT/US2020/051453.

(56) References Cited

OTHER PUBLICATIONS

Wygant et al., 50 kHz Capacitive Micromachined Ultrasonic Transducers for Generation of Highly Directional Sound with Parametric Arrays. IEEE Transactions on Ultrasonics, Ferroelectrics and Frequency Control. Jan. 2009; 56(1): 193-203.
International Search Report and Written Opinion dated Nov. 13, 2014 for Application No. PCT/US2014/032803.
International Search Report and Written Opinion dated Jun. 16, 2017 for Application No. PCT/US2017/025269.
International Preliminary Report on Patentability dated Oct. 11, 2018 in connection with International Application No. PCT/US2017/025269.
Extended European Search Report dated Oct. 25, 2019 in connection with European Application No. 17776733.2.
Extended European Search Report dated Oct. 25, 2019 in connection with European Application No. 17776738.1.
Agarwal et al., Single-Chip Solution for Ultrasound Imaging Systems: Initial Results. 2007 IEEE Ultrasonics Symposium. Oct. 1, 2007;1563-6.
Chen et al., Ultrasonic Imaging Front-End Design for CMUT: A 3-Level 30Vpp Pulse-Shaping Pulser with Improved Efficiency and a Noise-Optimized Receiver. IEEE Asian Solid-State Circuits Conference. Nov. 12-14, 2012;173-6.
Cheng et al., An Efficient Electrical Addressing Method Using Through-Wafer Vias for Two-Dimensional Ultrasonic Arrays. 2000 IEEE Ultrasonics Symposium. 2000;2:1179-82.
Cheng et al., CMUT-in-CMOS ultrasonic transducer arrays with on-chip electronics. Transducers 2009. IEEE. Jun. 21, 2009;1222-5.
Cheng et al., Electrical Through-Wafer Interconnects with Sub-PicoFarad Parasitic Capacitance. 2001 Microelectromechan Syst Conf. Aug. 24, 2001;18-21.
Daft et al., 5F-3 A Matrix Transducer Design with Improved Image Quality and Acquisition Rate. 2007 IEEE Ultrasonics Symposium. Oct. 1, 2007;411-5.
Daft et al., Microfabricated Ultrasonic Transducers Monolithically Integrated with High Voltage Electronics. 2004 IEEE Ultrasonics Symposium. Aug. 23, 2004;1:493-6.
Gurun et al., Front-end CMOS electronics for monolithic integration with CMUT arrays: Circuit Design and Initial Experimental Results. Proc Ultrason Symp. 2008;390-3.
Khuri-Yakub et al., Miniaturized Ultrasound Imaging Probes Enabled by CMUT Arrays with Integrated Frontend Electronic Circuits. Conf Proc IEEE Eng Med Biol Soc. 2010;1:5987-90. doi:10.1109/IEMBS.2010.5627580. Epub Dec. 6, 2010. 13 pages.
Kim et al., Design and Test of A Fully Controllable 64x128 2-D CMUT Array Integrated with Reconfigurable Frontend ASICs for Volumetric Ultrasound Imaging. IEEE. International Ultrasonics Symposium Proceedings. Oct. 7-10, 2012;77-80. doi: 10.1109/ULTSYM.2012.0019.
Extended European Search Report issued in European Application No. 20866012.6, dated Aug. 18, 2023 (10 pages).

\* cited by examiner

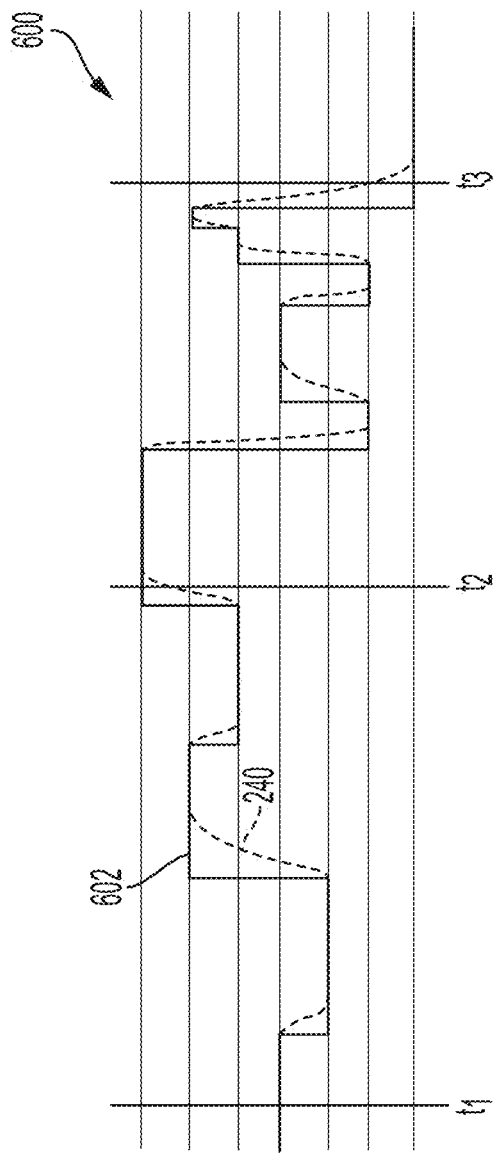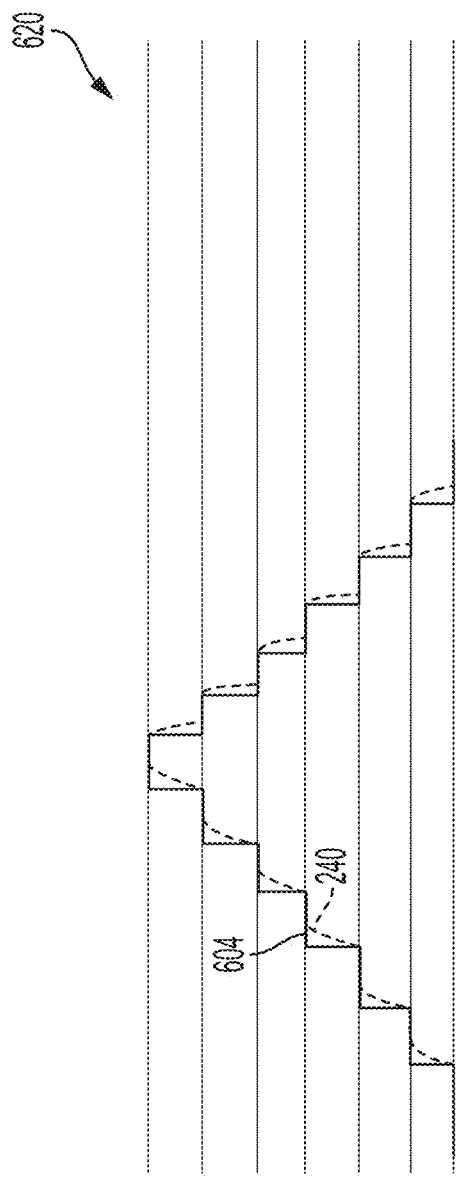

SYMMETRIC RECEIVER SWITCH FOR ULTRASOUND DEVICES

CROSS-REFERENCE TO RELATED APPLICATIONS

This application claims the benefit of priority under 35 U.S.C. § 119(e) of U.S. Provisional Patent Application Ser. No. 62/902,769, filed Sep. 19, 2019 and entitled "SYMMETRIC RECEIVER SWITCH FOR ULTRASOUND DEVICES," which is hereby incorporated herein by reference in its entirety.

FIELD

The technology of the present application relates to ultrasound devices that use bipolar pulsing for ultrasound imaging, and to ultrasound devices that use bipolar pulsing for high-intensity focused ultrasound applications.

RELATED ART

Some conventional ultrasound devices include pulsing circuits configured to provide pulses to an ultrasonic transducer. Often the ultrasonic transducer has two modes of operation: a transmission mode in which ultrasonic waves are emitted from the transducer, and a reception mode in which ultrasonic waves are received by the transducer.

BRIEF SUMMARY

Embodiments and aspects of the present technology provide an ultrasound-on-a-chip device including integrated circuitry having a pulser with feedback. Symmetric switches are also provided in the ultrasound-on-a-chip device and coupled to an output of the ultrasonic transducers to facilitate the use of pulsers, such as two-level pulsers and multi-level pulsers, for example, to drive the ultrasonic transducers. A fabricated arrangement of the symmetric switches may give rise to well capacitances, which may result from the device structure of the symmetric switches in one or more doped wells in a semiconductor substrate. Circuitry for a well switch may be provided, which may function to remove large well capacitances in a signal path of the device.

According to some embodiments of the present technology, an apparatus may comprise an array of symmetric receiver switches coupled between a receiving apparatus and an array of ultrasonic transducers. A first symmetric receiver switch of the array of symmetric receiver switches may comprise a first transistor comprising a first gate and a first source, and a second transistor comprising a second gate and a second source. The first and second gates may be coupled to each other, and the first and second sources may be coupled to each other. During a pulse transmit (TX) mode of the apparatus, the first symmetric receiver switch may be off, and, during a receive (RX) mode of the apparatus, the first symmetric receiver switch may be on.

In a first aspect, during the TX mode, the first and second gates and the first and second sources may be at a same electric potential.

In a variation of the first aspect, during the RX mode, the first and second gates may be at a floating potential. In a further variation, the first transistor may further comprise a first body, the second transistor may further comprise a second body, and, during the RX mode, the first and second bodies may be at a same electric potential; the same electric potential may be a floating potential, or a ground potential, or fixed non-ground potential. In another further variation, the first and second sources and the first and second bodies may be at a same electric potential. In another further variation, the first transistor may be an nMOS transistor and may further comprise a first body, the second transistor may be an nMOS transistor and may further comprise a second body, and, during the RX mode, the first and second bodies may be at an electric potential lower than the floating electric potential of the first and second gates. In another further variation, the first transistor may be a pMOS transistor and may further comprise a first body, the second transistor may be a pMOS transistor and may further comprise a second body, and, during the RX mode, the first and second bodies may be at an electric potential higher than the floating electric potential of the first and second gates.

In another variation of the first aspect, the first transistor may further comprise a first body, the second transistor may further comprise a second body, and, during the RX mode, the first and second bodies may be at a floating potential. The first and second gates also may be at a floating potential.

In a second aspect, the first transistor may further comprise a first body, the second transistor may further comprise a second body. During the TX mode, the first and second sources and the first and second bodies may be at a same electric potential. The first and second gates also may be at this same electric potential.

In a third aspect, the first transistor may further comprise a first drain connected to an ultrasonic transducer of the array, and the second transistor may further comprise a second drain connected to the receiving apparatus.

According to some embodiments of the present technology, an apparatus may comprise an array of symmetric receiver switches coupled between a receiving apparatus and an array of ultrasonic transducers. A first symmetric receiver switch of the array of symmetric receiver switches may comprise a first transistor having a first gate, a first source, a first body, and a first drain, and a second transistor having a second gate, a second source, a second body, and a second drain. The first and second gates may be coupled to each other, and the first and second sources may be coupled to each other. The first drain may be connected to a first ultrasonic transducer of the array, and the second drain may be connected to the receiving apparatus. During a pulse transmission (TX) mode of the apparatus, the first and second gates and the first and second sources may be at a same electric potential. During a reception (RX) mode of the apparatus: the first and second gates may be at a first floating electric potential, or the first and second bodies may be at the first floating potential, or the first and second gates and the first and second bodies may be at the first floating potential.

In a first aspect, during the TX mode, the first and second bodies may be at the same electric potential as the first and second sources.

In a second aspect, during the RX mode, the first and second bodies may be at a second floating electric potential.

In a third aspect, the first drain may be coupled to an input terminal of the first symmetric receiver switch, the second drain may be coupled to an output terminal of the first symmetric receiver switch, and, during the TX mode, the second drain may be at a fixed potential.

In a variation of the third aspect, the first transistor may be an nMOS transistor, the second transistor may be an nMOS transistor, and, during the TX mode, the second drain may be at an electric potential higher than the first floating potential. In a further variation, during the TX mode, the first and second transistors are off, and the same electric potential of the first and second gates and the first and second sources is a negative electric potential. For example, the first and second bodies may be at the negative electric potential of the first and second gates and the first and second sources. The negative electric potential may be in a range of: −1 V to −100 V, or −5 V to −20 V, or −10 V to −50 V, or −15 V to −75 V.

In another variation of the third aspect, the first transistor may be a pMOS transistor, the second transistor may be a pMOS transistor, and, during the TX mode, the second drain may be at an electric potential lower than the first floating potential. In a further variation, during the TX mode, the first and second transistors may be off, and the same electric potential of the first and second gates and the first and second sources may be a positive electric potential. For example, the first and second bodies may be at the positive electric potential of the first and second gates and the first and second sources. The positive electric potential may be in a range of: 1 V to 100 V, or 5 V to 20 V, or 10 V to 50 V, or 15 V to 75 V.

In a fourth aspect, the first drain may be coupled to an input terminal of the first symmetric receiver switch, the second drain may be coupled to an output terminal of the first symmetric receiver switch, and, during the TX mode, the second drain may be at ground potential.

In a fifth aspect, during the RX mode, the first and second transistors may be on.

In a variation of the fifth aspect, the first and second transistors may be nMOS transistors, and, during the RX mode, the first floating potential of the first and second gates may be a positive electric potential. The first and second gates may be selectively connected to and disconnected from a positive voltage source to set the first floating potential. For example, the positive electric potential may be in a range of: 1 V to 100 V, or 5 V to 20 V, or 10 V to 50 V, or 15 V to 75 V.

In another variation of the fifth aspect, first and second transistors may be pMOS transistors, and, during the RX mode, the first floating potential of the first and second gates may be a negative electric potential. The first and second gates may be selectively connected to and disconnected from a negative voltage source to set the first floating potential. For example, the negative electric potential may be in a range of: −1 V to −100 V, or −5 V to −20 V, or −10 V to −50 V, or −15 V to −75 V.

According to some embodiments of the present technology, an ultrasound device comprises an array of ultrasonic transducers, a receiving apparatus configured to process electrical signals output from the array of ultrasonic transducers, and an array of symmetric switches coupled between the receiving apparatus and the array of ultrasonic transducers. A first symmetric switch of the array of symmetric switches may comprise a first transistor comprising a first gate and a first source, and a second transistor comprising a second gate and a second source. The first and second gates may be coupled to each other, and the first and second sources may be coupled to each other. During a pulse transmit (TX) mode of the device, the first symmetric switch is off. During a receive (RX) mode of the device, the first symmetric switch is on.

In a first aspect, during the TX mode, the first and second gates and the first and second sources may be at a same electric potential. In a variation of the first aspect, the first transistor may further comprise a first body, the second transistor may further comprise a second body, and, during the RX mode, the first and second bodies may be at a floating potential. In a further variation, the first and second gates also may be at a floating potential.

In another variation of the first aspect, during the RX mode, the first and second gates may be at a floating potential. In a further variation, the first transistor may further comprise a first body, the second transistor may further comprise a second body, and, during the RX mode, the first and second bodies may be at a same electric potential, which may be a ground potential, or a floating potential, or a fixed non-ground potential. The first and second sources may be at the same electric potential as the first and second bodies. In another further variation, the first transistor may be an nMOS transistor and may further comprise a first body, the second transistor may be an nMOS transistor and may further comprise a second body, and, during the RX mode, the first and second bodies may be at an electric potential lower than the floating electric potential of the first and second gates. In an alternative further variation, the first transistor may be a pMOS transistor and may further comprise a first body, the second transistor may be a pMOS transistor and may further comprise a second body, and, during the RX mode, the first and second bodies may be at an electric potential higher than the floating electric potential of the first and second gates.

In a second aspect, the first transistor may further comprise a first body, the second transistor may further comprise a second body, and, during the TX mode, the first and second gates, the first and second sources, and the first and second bodies may be at a same electric potential.

In a third aspect, the first transistor may further comprise a first body, the second transistor may further comprise a second body, and, during the TX mode, the first and second bodies and the first and second sources may be at a same electric potential.

In a fourth aspect, the first transistor may further comprise a first drain connected to an ultrasonic transducer of the array, and the second transistor may further comprise a second drain connected to the receiving apparatus.

According to some embodiments of the present technology, an ultrasound device may comprise an ultrasonic transducer, a receiving apparatus configured to process an electrical signal output from the ultrasonic transducer, and a symmetric switch having an input terminal coupled the ultrasonic transducer and an output terminal coupled to the receiving apparatus. The symmetric switch may comprise a first transistor comprising a first gate and a first source, and a second transistor comprising a second gate and a second source. The first and second gates may be coupled to each other, and the first and second sources may be coupled to each other. During a pulse transmit (TX) mode of the device, the symmetric switch may be off. During a receive (RX) mode of the device, the symmetric switch may be on.

In a first aspect, during the TX mode, the first and second gates and the first and second sources may be at a same electric potential.

In a variation of the first aspect, during the RX mode, the first and second gates may be at a floating potential. In a further variation, the first transistor may further comprise a first body, the second transistor may further comprise a second body, and, during the RX mode, the first and second bodies may be at a same electric potential, which may be a floating potential or a ground potential or a fixed potential. The first and second sources may be at the same electric potential as the first and second bodies during the RX mode. In another further variation, the first transistor may be an nMOS transistor and may further comprise a first body, the second transistor may be an nMOS transistor and may further comprise a second body, and, during the RX mode, the first and second bodies may be at an electric potential lower than the floating electric potential of the first and second gates. In another further variation, the first transistor may be a pMOS transistor and may further comprise a first body, the second transistor may be a pMOS transistor and may further comprise a second body, and, during the RX mode, the first and second bodies may be at an electric potential higher than the floating electric potential of the first and second gates.

In another variation of the first aspect, the first transistor may further comprise a first body, the second transistor may further comprise a second body, and, during the RX mode, the first and second bodies may be at a floating potential. In a further variation, the first and second gates also may be at the floating potential.

In a second aspect, the first transistor may further comprise a first body, the second transistor may further comprise a second body, and, during the TX mode, the first and second sources and the first and second bodies may be at a same electric potential. In a variation, the first and second gates also may be at the same electric potential.

In a third aspect, the first transistor may further comprise a first drain connected to an ultrasonic transducer of the array, and the second transistor may further comprise a second drain connected to the receiving apparatus.

According to some embodiments of the present technology, an ultrasound device may comprise an array of ultrasonic transducers, a receiving apparatus configured to process electrical signals output from the array of ultrasonic transducers, and an array of symmetric switches coupled between the receiving apparatus and the array of ultrasonic transducers. a first symmetric switch of the array of symmetric switches may comprise a first transistor having a first gate, a first source, a first body, and a first drain, and a second transistor having a second gate, a second source, a second body, and a second drain, The first and second gates may be coupled to each other, and the first and second sources may be coupled to each other. The first drain may be connected to a first ultrasonic transducer of the array, and the second drain may be connected to the receiving apparatus. During a pulse transmission (TX) mode of the device, the first and second gates and the first and second sources may be at a same electric potential. During a reception (RX) mode of the device, the first and second gates may be at a first floating electric potential, or the first and second bodies may be at the first floating potential, or the first and second gates and the first and second bodies may be at the first floating potential.

In a first aspect, during the TX mode, the first and second bodies may be at the same electric potential as the first and second sources.

In a second aspect, during the RX mode, the first and second bodies may be at a second floating electric potential.

In a third aspect, the first drain may be coupled to an input terminal of the first symmetric receiver switch, the second drain may be coupled to an output terminal of the first symmetric receiver switch, and, during the TX mode, the second drain may be at a fixed potential.

In a variation of the third aspect the first transistor may be an nMOS transistor, the second transistor may be an nMOS transistor, and, during the TX mode, the second drain may be at an electric potential higher than the first floating potential. In a further variation, during the TX mode, the first and second transistors may be off, and the same electric potential of the first and second gates and the first and second sources may be a negative electric potential. The first and second bodies also may be at the negative electric potential of the first and second gates and the first and second sources. The negative electric potential may be in a range of: −1 V to −100 V, or −5 V to −20 V, or −10 V to −50 V, or −15 V to −75 V.

In another variation of the third aspect, the first transistor may be a pMOS transistor, the second transistor may be a pMOS transistor, and, during the TX mode, the second drain may be at an electric potential lower than the first floating potential. In a further variation, during the TX mode, the first and second transistors may be off, and the same electric potential of the first and second gates and the first and second sources may be a positive electric potential. The first and second bodies may be at the positive electric potential of the first and second gates and the first and second sources. The positive electric potential may be in a range of: 1 V to 100 V, or 5 V to 20 V, or 10 V to 50 V, or 15 V to 75 V.

In an fourth aspect, the first drain may be coupled to an input terminal of the first symmetric receiver switch, the second drain may be coupled to an output terminal of the first symmetric receiver switch, and, during the TX mode, the second drain may be at ground potential.

In a fifth aspect, during the RX mode, the first and second transistors may be on.

In a variation of the fifth aspect, the first and second transistors may be nMOS transistors, and, during the RX mode, the first floating potential of the first and second gates may be a positive electric potential. In a further variation, the first and second gates may be selectively connected to and disconnected from a positive voltage source to set the first floating potential. In another further variation, the positive electric potential may be in a range of: 1 V to 100 V, or 5 V to 20 V, or 10 V to 50 V, or 15 V to 75 V.

In another variation of the fifth aspect, the first and second transistors may be pMOS transistors, and, during the RX mode, the first floating potential of the first and second gates may be a negative electric potential. In a further variation, the first and second gates may be selectively connected to and disconnected from a negative voltage source to set the first floating potential. The negative electric potential may be in a range of: −1 V to −100 V, or −5 V to −20 V, or −10 V to −50 V, or −15 V to −75 V.

According to some embodiments of the present technology, an ultrasound device may comprise an ultrasonic transducer, a receiving apparatus configured to process an electrical signal output from the ultrasonic transducer, and a symmetric switch having an input terminal coupled the ultrasonic transducer and an output terminal coupled to the receiving apparatus. The symmetric switch may comprise a first transistor having a first gate, a first source, a first body, and a first drain, and a second transistor having a second gate, a second source, a second body, and a second drain. The first and second gates may be coupled to each other, and the first and second sources may be coupled to each other. The first drain may be connected to a first ultrasonic transducer of the array, and the second drain may be connected to the receiving apparatus. During a pulse transmission (TX) mode of the device, the first and second gates and the first and second sources may be at a same electric potential. During a reception (RX) mode of the device, the first and second gates may be at a first floating electric potential, or the first and second bodies may be at the first floating potential, or the first and second gates and the first and second bodies may be at the first floating potential.

In a first aspect, during the TX mode, the first and second bodies may be at the same electric potential as the first and second sources.

In a second aspect, during the RX mode, the first and second bodies may be at a second floating electric potential.

In a third aspect, the first drain may be coupled to an input terminal of the symmetric switch, the second drain may be coupled to an output terminal of the symmetric switch, and, during the TX mode, the second drain may be at a fixed potential.

In a variation of the third aspect, the first transistor may be an nMOS transistor, the second transistor may be an nMOS transistor, and, during the TX mode, the second drain may be at an electric potential higher than the first floating potential. In a further variation, during the TX mode, the first and second transistors may be off, and the same electric potential of the first and second gates and the first and second sources may be a negative electric potential. The first and second bodies may be at the negative electric potential of the first and second gates and the first and second sources. The negative electric potential may be in a range of: −1 V to −100 V, or −5 V to −20 V, or −10 V to −50 V, or −15 V to −75 V.

In another variation of the third aspect, the first transistor may be a pMOS transistor, the second transistor may be a pMOS transistor, and, during the TX mode, the second drain may be at an electric potential lower than the first floating potential. In a further variation, during the TX mode, the first and second transistors may be off, and the same electric potential of the first and second gates and the first and second sources may be a positive electric potential. The first and second bodies may be at the positive electric potential of the first and second gates and the first and second sources. The positive electric potential may be in a range of: 1 V to 100 V, or 5 V to 20 V, or 10 V to 50 V, or 15 V to 75 V.

In a fourth aspect, the first drain may be coupled to an input terminal of the symmetric switch, the second drain may be coupled to an output terminal of the symmetric switch, and, during the TX mode, the second drain may be at ground potential.

In a fifth aspect, during the RX mode, the first and second transistors may be on.

In a variation of the fifth aspect, the first and second transistors may be nMOS transistors, and, during the RX mode, the first floating potential of the first and second gates may be a positive electric potential. In a further variation, the first and second gates may be selectively connected to and disconnected from a positive voltage source to set the first floating potential. The positive electric potential may be in a range of: 1 V to 100 V, or 5 V to 20 V, or 10 V to 50 V, or 15 V to 75 V.

In another variation of the fifth aspect, the first and second transistors may be pMOS transistors, and, during the RX mode, the first floating potential of the first and second gates may be a negative electric potential. The first and second gates may be selectively connected to and disconnected from a negative voltage source to set the first floating potential. The negative electric potential may be in a range of: −1 V to −100 V, or −5 V to −20 V, or −10 V to −50 V, or −15 V to −75 V.

According to some embodiments of the present technology, a method of using an ultrasound device or an apparatus, such as those described above, may comprise: in the TX mode, causing the symmetric switch to be off; and, in the RX mode, causing the symmetric switch to be on.

According to some embodiments of the present technology, a method of using an ultrasound device or an apparatus, such as those described above, may comprise: entering the TX mode by causing the first and second gates and the first and second sources to be at a same electric potential; and entering the RX mode by causing the first and second gates to be at a first floating electric potential or causing the first and second bodies to be at the first floating potential or causing the first and second gates and the first and second bodies to be at the first floating potential.

BRIEF DESCRIPTION OF THE DRAWINGS

Various aspects and embodiments of the application will be described with reference to the accompanying figures. It should be appreciated that the figures are not necessarily drawn to scale. Items appearing in multiple figures may be indicated by the same reference number in all the figures in which they appear. In the figures:

FIG. 6A illustrates a timing diagram showing an example signal provided by the pulsing circuit to the capacitive ultrasonic transducer.

FIG. 6B illustrates a timing diagram showing an apodized signal provided by the pulsing circuit to the capacitive ultrasonic transducer.

DETAILED DESCRIPTION

Figure 2:
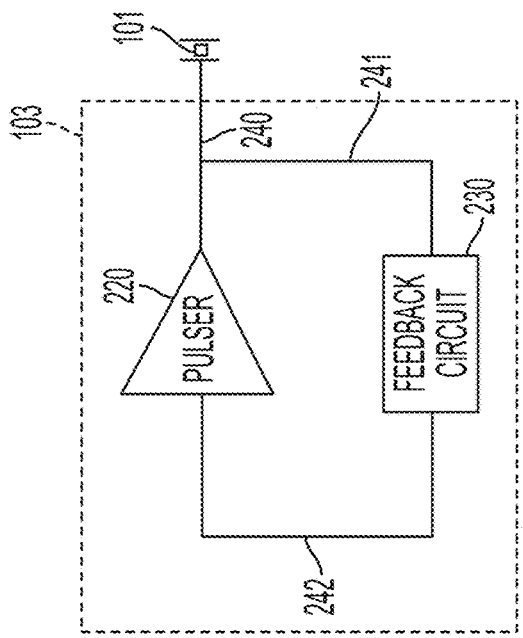
FIG. 2 is a block diagram illustrating a pulsing circuit coupled to a capacitive ultrasonic transducer.

An ultrasound-on-a-chip device may include ultrasonic transducers integrated with circuitry on a semiconductor die, also referred to herein as a "chip." The ultrasound-on-a-chip device may be employed within an ultrasound probe or other ultrasound device to perform ultrasound imaging, therapy (e.g., high-intensity focused ultrasound (HIFU)), or both. Thus, the circuitry integrated with the ultrasonic transducers may support such functions and assume a form appropriate for being employed in a probe or other form factor, such as a stethoscope. The circuitry may include pulsing circuits, which may generate electrical pulses used to drive the ultrasonic transducers of the ultrasound-on-a-chip device to generate ultrasound signals (e.g., ultrasonic waves) appropriate for imaging and/or HIFU. The pulsing circuits may be digital, analog, or mixed analog-digital.

Aspects of the present technology may provide bipolar, multi-level pulsing circuits with feedback. Although these circuits may be used for unipolar pulsing, Applicant has appreciated that ultrasound devices configured to transmit unipolar pulses exhibit limited dynamic range because the direct current (DC) component associated with unipolar pulses may saturate a receiving circuit used to receive signals corresponding to reflected ultrasonic waves, thus deteriorating the contrast of the image produced. Unipolar pulses may be pulses that only assume voltages greater than or equal to zero (0) or, alternatively, voltages less than or equal to zero (0). Applicant has appreciated that, in contrast, the use of bipolar pulses may limit the impact of the DC component on the receiving circuit and thus may provide significantly increased dynamic range and image contrast compared to ultrasound devices utilizing unipolar pulses. Thus, aspects of the present technology may provide ultrasound devices configured to utilize bipolar pulses, which are pulses that can assume voltages that are greater than, less than, or equal to zero (0).

The use of multi-level pulsing circuits with feedback arises from Applicant's appreciation that the contrast of ultrasound images may be significantly enhanced by performing time-domain and space-domain apodization of the pulses of ultrasonic waves transmitted to the target being imaged. Apodization may reduce the extent of the side-lobes associated with transmitted pulses, thus increasing the resolution of the image produced. The generation of temporally and spatially apodized pulses may be facilitated by the ability to control signals that can assume multiple values.

Multi-level pulses of the type described herein can assume any value selected from among a set of selectable values, where the set may comprise at least three values. The generation of such multi-level pulses may require complicated pulser designs where multiple supply voltages are provided. However, providing multiple supply voltages may be impractical. This may be especially true when the ultrasound device is to be disposed in a handheld ultrasound probe or other compact form, because additional off-chip supply circuits may be required. Applicant has appreciated that the use of feedback circuits may facilitate the generation of multi-level pulses and the generation of apodized pulses without resorting to multiple supply voltages, thus simplifying the design of the ultrasound device.

Aspects of the present technology provide an ultrasound device comprising a symmetric switch arranged to couple an ultrasonic transducer to receive circuitry. The use of a bipolar pulsing circuit may be beneficial for at least the reasons described above; however, bipolar pulses can have detrimental effects on the ultrasound device's receive circuitry. Bipolar pulses generated by a transmitting circuit may inadvertently electrically couple directly to a receiving circuit, which may not be designed to withstand large positive and negative voltage signals of the bipolar pulses. As a consequence, the ultrasound device may be damaged if proper protection is not provided for the receive circuitry. Applicant has appreciated that a suitably positioned symmetric switch designed to block large positive and negative voltage signals associated with bipolar pulses may prevent damage to the receive circuitry, thus protecting the ultrasound device when used with a bipolar pulsing circuit.

Applicant has appreciated that a fabricated arrangement of the symmetric switch may give rise to well capacitances, which may result from the device structure of the symmetric switch being disposed in one or more doped wells in a semiconductor substrate. For example, transistors forming the symmetric switch may be disposed in a doped well that, in turn, may be disposed in another doped well. The wells may be high-voltage wells that may give rise to large well capacitances in a signal path of the ultrasound device. In order to reduce or eliminate noise coupling through the well(s), the symmetric switch may be provided with a well switch, which may function to remove the well capacitances in the signal path.

CMOS circuitry features described herein may facilitate creation of an ultrasound-on-a-chip device suitable for performing ultrasound imaging and/or HIFU in a commercially valuable form factor.

Figure 1:
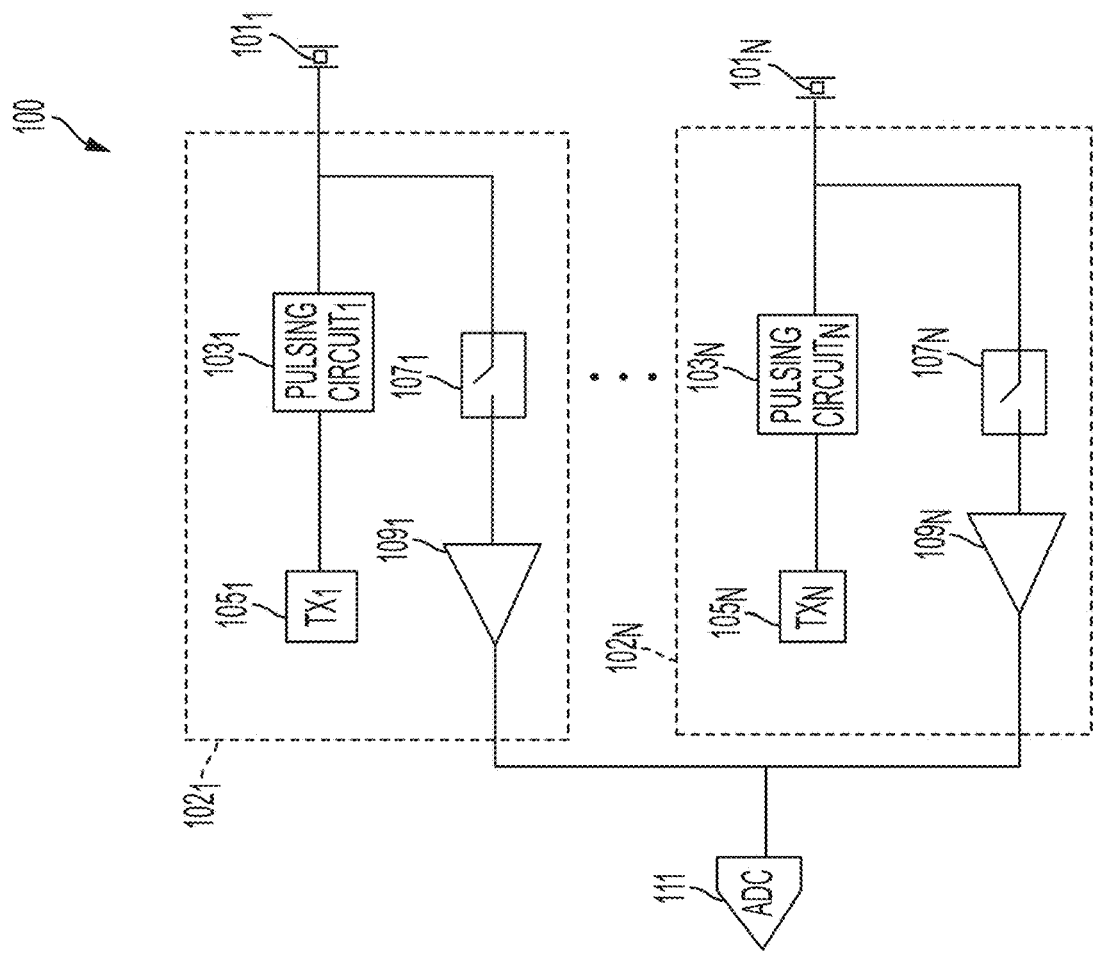
FIG. 1 is a block diagram illustrating an ultrasound device including a plurality of pulsing circuits and a plurality of receiver switches.

Turning now to the figures, as described above, aspects of the present technology provide an ultrasound device comprising a bipolar, multi-level pulsing circuit and a symmetric switch that couples the bipolar, multi-level pulsing circuit to receive circuitry. FIG. 1 is a block diagram illustrating the general architecture of an ultrasound device, which may include various features in accordance with aspects of the present technology. The ultrasound device 100 may comprise a plurality of capacitive ultrasonic transducers $101_1 \ldots 101_N$, where N is an integer. The ultrasound device 100 may comprise a plurality of circuitry channels $102_1 \ldots 102_N$, which may be electrically connected respectively to the ultrasonic transducers $101_1 \ldots 101_N$.

The ultrasonic transducers $101_1 \ldots 101_N$ may be sensors in some embodiments and may produce electrical signals representing received ultrasonic waves. The ultrasonic transducers $101_1 \ldots 101_N$ also may transmit ultrasound signals (i.e., ultrasonic waves) in some embodiments. The ultrasonic transducers $101_1 \ldots 101_N$ may be capacitive micromachined ultrasonic transducers (CMUTs) in some embodiments. However, other types of capacitive ultrasonic transducers may be used in other embodiments.

The circuitry channels $102_1 \ldots 102_N$ may include transmit circuitry, receive circuitry, or both. The transmit circuitry may include transmit decoders $105_1 \ldots 105_N$ coupled respectively to pulsing circuits $103_1 \ldots 103_N$. The pulsing circuits $103_1 \ldots 103_N$ may control the respective ultrasonic transducers $101_1 \ldots 101_N$ to emit ultrasound signals.

Aspects of the present application relate to the pulsing circuits $103_1 \ldots 103_N$. In some aspects, the pulsing circuits $103_1 \ldots 103_N$ may be configured to generate bipolar pulses. In some aspects, the pulsing circuits $103_1 \ldots 103_N$ may be configured to generate multi-level pulses. As will be described further below, the pulsing circuits $103_1 \ldots 103_N$ may include pulsers and additional circuitry in some aspects. In some aspects, the pulsing circuits $103_1 \ldots 103_N$ may include pulsers and feedback circuitry.

The receive circuitry of the circuitry channels $102_1 \ldots 102_N$ may receive electrical signals respectively output from the ultrasonic transducers $101_1 \ldots 101_N$. In the illustrated example, the circuitry channels $102_1 \ldots 102_N$ respectively may comprise receive switches $107_1 \ldots 107_N$ and receiving circuits $109_1 \ldots 109_N$. Each of the receive switches $107_1 \ldots 107_N$ may be selectively controlled to activate or deactivate readout of an electrical signal from a corresponding one of the ultrasonic transducers $101_1 \ldots 101_N$. The receiving circuits $109_1 \ldots 109_N$ may comprise current-to-voltage converters. The current-to-voltage converters may comprise trans-impedance amplifiers (TIAs); therefore, the receiving circuits $109_1 \ldots 109_N$ are illustrated as TIAs, although additional and/or alternative circuitry may constitute the receiving circuits $109_1 \ldots 109_N$. As will be appreciated, instead of current-to-voltage converters, the receiving circuits $109_1 \ldots 109_N$ may comprise current-to-digital converters and/or current-input, analog-to-digital converters.

Aspects of the present application relate to the receive switches $107_1 \ldots 107_N$. In some aspects, the receive switches $107_1 \ldots 107_N$ may comprise symmetric switches configured to block large voltage signals exhibiting positive and/or negative voltages. The receive switches $107_1 \ldots 107_N$ may be configured to form electrical open circuits to decouple, respectively, the receiving circuits $109_1 \ldots 109_N$ from the transmit circuitry and from the ultrasonic transducers $101_1 \ldots 101_N$ during a transmit mode. The receive switches $107_1 \ldots 107_N$ may be further configured to form electrical short circuits to couple, respectively, the receiving circuits $109_1 \ldots 109_N$ to the ultrasonic transducers $101_1 \ldots 101_N$ during a receive mode.

The ultrasound device 100 may further comprise an analog-to-digital converter (ADC) 111. The ADC 111 may be configured to digitize the signals received from the ultrasonic transducers $101_1 \ldots 101_N$. Digitization of the received signals may be performed in series or in parallel. Although a single ADC 111 is illustrated, and thus is shown as being shared by the circuitry channels $102_1 \ldots 102_N$, alternative aspects of the present technology may provide for one ADC per circuitry channel or per group of circuitry channels.

Although FIG. 1 may illustrate a number of components as part of a circuit of the ultrasound device 100, it should be appreciated that the various aspects described herein are not limited to the exact components or configurations of components illustrated.

The components illustrated in FIG. 1 may be located on a single substrate or on different substrates. When located on a single substrate, the substrate may, for example, be a semiconductor substrate (e.g. a silicon substrate), and the components may be monolithically integrated thereon. When the illustrated components are not on the same substrate, the ultrasonic transducers $101_1 \ldots 101_N$ may be on a first substrate and the remaining illustrated components may be on a second substrate, as an example. As a further alternative, the ultrasonic transducers $101_1 \ldots 101_N$ and some of the illustrated components may be on the same substrate, and the other components may be on a different substrate. When multiple substrates are used, they may be semiconductor substrates (e.g. silicon substrates).

According to aspects of the present technology, the components of FIG. 1 may form part of an ultrasound probe, which may be handheld. In an aspect, the components of FIG. 1 may form part of an ultrasound patch configured to be worn by a patient.

FIG. 2 is a block diagram illustrating an example of a pulsing circuit 103, which may serve as any of the pulsing circuits $103_1 \ldots 103_N$ of FIG. 1, according to aspects of the present technology. The pulsing circuit 103 may comprise a pulser 220 and a feedback circuit 230. The pulsing circuit 103 may comprise an output terminal electrically connected to a capacitive ultrasonic transducer 101 and may be configured to provide an input signal 240 to the capacitive ultrasonic transducer 101. In some aspects, the pulser 220 may be configured to generate bipolar pulses, which may assume positive and negative values in addition to zero. By generating bipolar pulses, the pulser 220 may diminish or suppress any DC component associated with pulses provided to the ultrasonic transducer 101. As noted previously, when pulses having a DC component are transmitted, the quality of the image produced by ultrasound device 100 may be degraded. Compared to a passband component of the pulses, the DC component may attenuate significantly less while propagating through an object being imaged. Consequently, the receiving circuit may receive a signal in which the DC component is significantly greater than the passband component. As a result, the receiving circuit may saturate and thus limit the dynamic range of the image.

In some aspects of the present technology, the feedback circuit 230 may be configured to control the pulser 220 to generate multi-level pulses. Multi-level pulses can assume any value selected from among a set of selectable values. The set may comprise at least three values and, in at least some aspects, may comprise four or more values (e.g., between 3 and 30 values, between 4 and 20 values, between 4 and 10 values, or any number within those ranges). The use of multi-level pulses may enable optimization of an envelope of the pulses to maximize a parameter of an ultrasound image formed from the pulses. For example, the envelope of the pulses may be engineered to maximize image contrast. In particular, by using time-domain apodization, the resulting frequency content of the pulses may exhibit a large main-lobe and suppressed side-lobes, which may increase imaging resolution. Time-domain apodization may require pulses exhibiting as many voltage levels as possible to produce nearly continuous window functions. However, to generate pulses having a large number of levels, complex pulsing circuits may be required. Therefore, the number of levels should be chosen to maximize the ability to perform time-domain apodization while keeping the pulsing circuit 103 relatively simple and compact. In some aspects of the present technology, the pulser 220 may be configured to generate multi-level pulses that may have between 3 and 30 levels, between 5 and 10 levels, or between any suitable value or range of values.

The use of multi-level pulses also may enable space-domain apodization. To perform space-domain apodization, the ultrasonic transducers $101_1 \ldots 101_N$ may be driven with input signals having space-dependent amplitudes. Provision of input signals having space-dependent amplitudes may be facilitated by having access to reference voltages.

In some aspects of the present technology, the feedback circuit 230 may be configured to facilitate multi-level pulse generation by providing a plurality of reference voltages. The use of feedback circuits of the type described herein may facilitate the design of multi-level pulsers without resorting to multiple supply voltages. As noted above, it may be undesirable to utilize multiple supply voltages because multiple supply voltages may necessitate a sizeable ultrasound probe, which may be difficult to fit in a handheld form factor. In contrast, feedback circuits of the type described herein may enable compact circuitry to be used for generating reference voltages; such compact circuitry may be easily incorporated in handheld ultrasound probes.

As depicted in the block diagram of FIG. 2, an output terminal of the feedback circuit 230 may be electrically coupled to an input terminal of the pulser 220. An input terminal of feedback circuit 230 may be electrically coupled to an output terminal of pulser 220. The input terminal of the feedback circuit 230 also may be configured to receive a detection signal 241 representing an input signal 240 to the ultrasonic transducer 101. In some aspects of the present technology, the input signal 240 and the detection signal 241 may be voltages. In some aspects of the present technology, the detection signal 241 may be derived from the input signal 240. For example, the detection signal 241 may be proportional to the input signal 240.

The feedback circuit 230 may be configured to compare the detection signal 241 to a threshold voltage. In some aspects of the present technology, the threshold voltage may be selected from among a set of selectable threshold voltages. Based on a comparison result, the feedback circuit 230 may provide a control signal 242 to the input terminal of pulser 220.

In some aspects of the present technology, the feedback circuit 230 may be configured to determine whether the detection signal 241 has a value that is greater than, less than, or equal to a threshold voltage. In some aspects of the present technology, the feedback circuit 230 may be configured to determine whether the value of the detection signal 241 is within a range of the threshold voltage, such as within 10% of the threshold voltage, within 5% of the threshold voltage, or within any desirable range. Based on the value of detection signal 241 relative to the threshold voltage, the feedback circuit 230 may control the pulser 220 to hold a current value of the input signal 240 or to change the input signal 240 to another value. For example, if the detection signal 241 has a value that is less than the threshold voltage, the feedback circuit 230 may control the pulser 220 to increase the value of the input signal 240 until the detection signal 241 has a value that is equal to, or within a predetermined range of, the threshold voltage. If the value of detection signal 241 is greater than the threshold voltage, the feedback circuit 230 may control the pulser 220 to decrease the value of the input signal 240 until the detection signal 241 has a value that is equal to, or within a predetermined range of, the threshold voltage.

In some aspects of the present technology, the ultrasonic transducer 101 is a capacitive ultrasonic transducer (CUT) 101. A capacitance associated with the CUT 101 may cause an electric charge to be retained, which may result a constant voltage being maintained across its terminals when the detection signal 241 has reached a selected threshold voltage. When the detection signal 241 has a value that is less than the threshold voltage, the pulser 220 may be controlled to charge the capacitance associated with CUT 101, thus increasing a value of the input signal 240. When the detection signal 241 has a value that is greater than the threshold voltage, the pulser 220 may be controlled to discharge, or negatively charge, the capacitance associated with CUT 101, thus decreasing a value of the input signal 240.

In some aspects of the present technology, the feedback circuit 230 may control the pulser 220 asynchronously. Accordingly, values of the control signal 242, the input signal 240, and the detection signal 241 may be allowed to vary at any moment in time. In some aspects of the present technology, the pulsing circuit 103 may be timed by a clock signal. However, the control signal 242 may still be allowed to vary during periods of time that are not defined by the clock signal.

Figure 3:
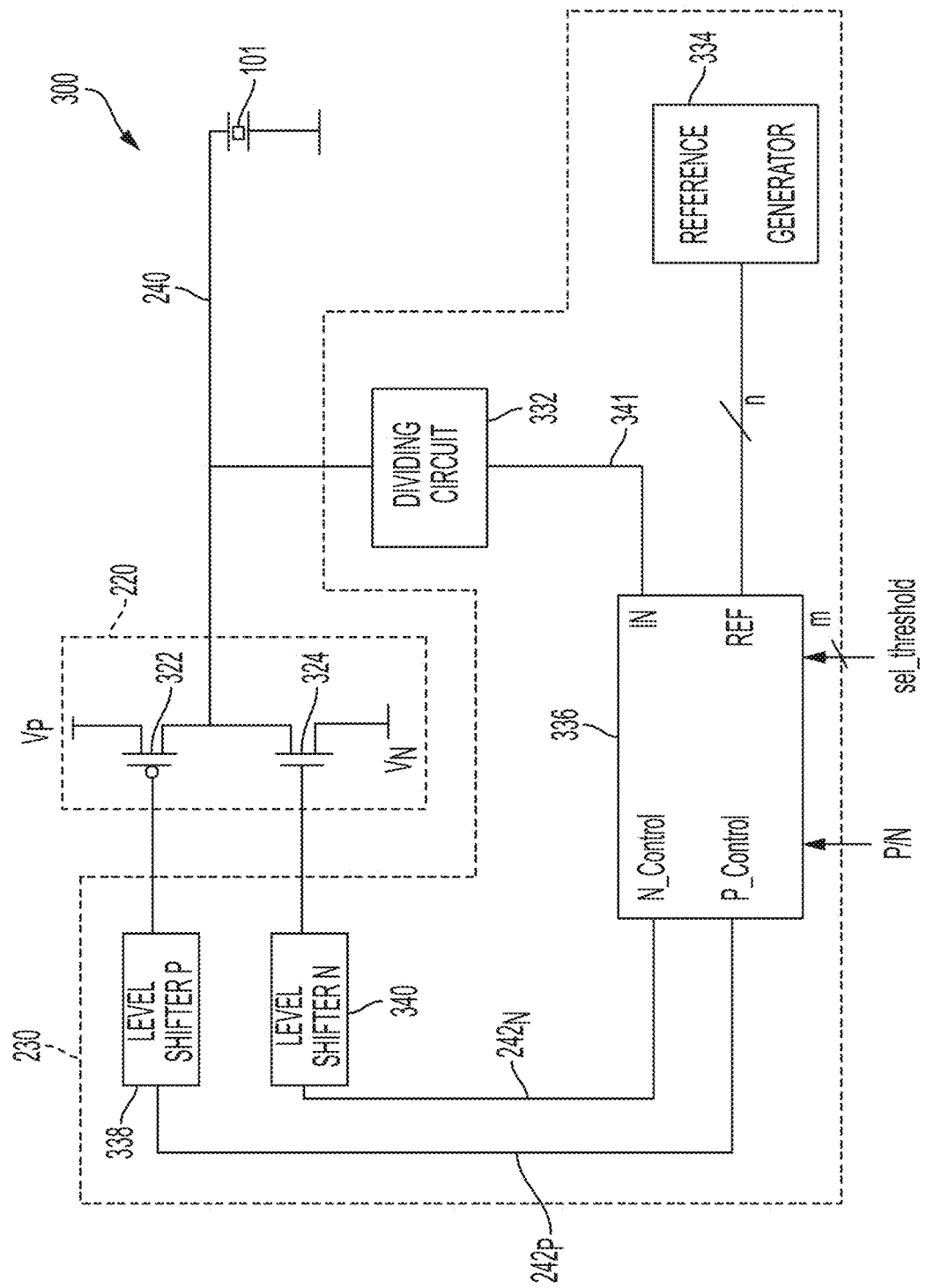
FIG. 3 is a block diagram illustrating a pulsing circuit comprising a pulser and a feedback circuit.

FIG. 3 is a block diagram illustrating a detailed implementation of an example of the pulsing circuit 103 of FIG. 2. In some aspects of the present technology, the pulser 220 may comprise two transistors 322, 324. It should be understood, however, that in other aspects the pulser 220 may comprise a different number of transistors. The transistors 322, 324 may comprise metal-oxide-semiconductor field effect transistors (MOSFETs), junction field effect transistors (JFETs), bipolar junction transistors (BJTs), metal-semiconductor field effect transistors (MESFETs), insulated gate field effect transistors (IGFETs), laterally diffused metal-oxide-semiconductor transistors (LDMOS), or any suitable combination thereof. The transistor 322 may have one type of conductivity that is different from a type of conductivity of the transistor 324. For example, the transistor 322 may have a conductivity that is based on drift currents sustained by holes moving under the effect of an electric field. The transistor 324 may have a conductivity that is based on drift currents sustained by electrons moving under the effect of an electric field.

In some aspects of the present technology, the transistor 324 may be an nMOSFET and the transistor 322 may be a pMOSFET. The transistors 322, 324 may be configured such that the drain of the nMOS transistor 324 may be connected to the drain of pMOS transistor 324. These drains may be further connected to a terminal of the CUT 101. The source of the nMOS transistor 324 may be connected to a supply voltage $V_N$. In some aspects, $V_N$ may be less than zero; for example, $V_N$ may be between −100V and −1V, between −50V and −20V, or between any desirable range of values. The source of the pMOS transistor 322 may be connected to a supply voltage $V_P$. In some aspects, $V_P$ may be greater than zero; for example, $V_P$ may be between 1V and 100V, between 20V and 50V, or between any desirable range of values. The voltages provided to the gates of the transistors 322, 324 may be generated by the feedback circuit 230 illustrated in FIG. 2.

In some aspects of the technology, the feedback circuit 230 may comprise a controller 336, a dividing circuit 332, and a reference generator 334. In some aspects, the feedback circuit 230 may further comprise level shifters 338, 340. The dividing circuit 332 may be configured to receive a voltage corresponding to the input signal 240, and to output a detection signal 341. The dividing circuit 332 may be configured to output the detection signal 341 to be proportional to the input signal 240. The detection signal 341 may be provided to the controller 336 through an input terminal IN of the controller 336.

The reference generator 334 may be configured to provide a set of selectable threshold voltages to an input terminal REF of the controller 336. In some aspects of the technology, the reference generator 334 may be connected to the controller 336 via n connectors and may be configured to provide n threshold voltages via corresponding ones of the n connectors, where n may assume any suitable value greater than two. The threshold voltages may be equal to, greater than, or less than zero.

In some aspects of the technology, the feedback circuit 230 may be digitally controlled, and the controller 336 may comprise a digital control circuitry. The controller 336 may be configured to control the pulser 220 to hold, increase, or decrease a voltage value corresponding to the input signal 240 based on a comparison of the detection signal 341 with a threshold voltage selected from among the n threshold voltages.

The controller 336 may select a threshold voltage from the n threshold voltages provided by the reference generator 334. For example, the threshold voltage may be digitally selected through a signal, e.g., a sel_threshold signal. The sel_threshold signal may comprise m bits, where m has a value is such that n is equal to, or less than, $2^m$. Each bit combination may select one threshold voltage from the n threshold voltages. For example, a sel_threshold sequence equal to 000 may select the least or smallest voltage of eight threshold voltages, and a sel_threshold sequence equal to 111 may select the largest voltage of eight threshold voltages. Furthermore, the sel_threshold signal may be varied asynchronously.

In some aspects of the present technology, the dividing circuit 332 may output the detection signal 341 to be proportional to the input signal 240 by a scaling factor. In such aspects, the reference generator 334 may be configured to provide a set of threshold voltages that are scaled to the input signal 240 by the same scaling factor. Consequently, the detection signal 341 may be directly compared to the selected threshold voltage without having to further scale the detection signal 341 or the input signal 240.

In aspects of the present technology, a signal P/N may be used to control a status of the transistors 322, 324. For example, P/N may be a single-bit signal. The signal P/N may be set to a P signal to activate the transistor 322, or to an N signal to activate the transistor 324. However, any suitable number of bits configured to control the status of the transistors 322, 324 may be used. The value of the single bit may cause either the transistor 322 or the transistor 324 to go into a conductive state, whether in linear mode or saturation mode. In an aspect, only one transistor at a time may be in a conductive state.

Based on values of the sel_threshold signal and the P/N signal, the controller 336 may output control signals $242_P$, $242_N$ through output terminals P_Control, N_Control. Together, the control signals $242_P$, $242_N$ may represent the control signal 242 illustrated in FIG. 2. For example, the signal $242_P$ may comprise a single bit and may be used to control a state of the pMOS transistor 322, and the signal $242_N$ may comprise a single bit and may be used to control a state of the nMOS transistor 324. The two transistors 322, 324 may be allowed to be in a cutoff state simultaneously.

In some aspects of the present technology, control signals $242_P$ and $242_N$ may directly drive the gates of transistors 322 and 324 respectively. In other aspects, as shown in FIG. 3, the control signals $242_P$, $242_N$ may be coupled to input terminals of the level shifter 338 and the level shifter 340, respectively. An output terminal of the level shifter 338 may be coupled to the gate of the transistor 322, and an output terminal of the level shifter 340 may be coupled to the gate of the transistor 324. The level shifters 338, 340 may be configured to adapt the voltages generated by the controller 336 to voltages compatible with the transistors 322, 324, to drive the transistors 322, 324 into their cutoff or conductive states, based on the signals $242_P$ and $242_N$.

In an aspect of the present technology, when the detection signal 341 is less than the selected threshold voltage, the controller 336 may be configured to output the control signals $242_P$, $242_N$ to have values suitable to cause the pMOS transistor 322 to go into a conductive state and to cause the nMOS 324 transistor to go into a cutoff state. In this aspect, an electric current flowing from a voltage supply $V_P$ to the CUT 101 may charge the CUT 101 until the detection signal 341 reaches the selected threshold voltage or reaches a voltage within a predetermined range of the selected threshold voltage.

In an aspect of the present technology, when the detection signal 341 is greater than the selected threshold voltage, the controller 336 may be configured to output the control signals $242_P$, $242_N$ to have values suitable to cause the nMOS transistor 324 to go into a conductive state and to cause the pMOS transistor 322 to go into a cutoff state. In this aspect, an electric current flowing from the CUT 101 to a voltage supply $V_N$ may discharge, or negatively charge, the CUT 101 until the detection signal 341 reaches the selected threshold voltage or reaches a voltage within a predetermined range of the selected threshold voltage.

In an aspect of the present technology, when the detection signal 241 is equal to or within a predetermined range of the selected threshold voltage, the pMOS transistor 322 and the nMOS transistor 324 may be controlled through the signals $242_P$, $242_N$ such that both transistors 322, 324 go into a cutoff state. In this aspect, no electric current would flow to or from the CUT 101. Consequently, the CUT 101 may retain an electric charge and thus hold a target voltage corresponding to the selected threshold voltage across its terminals.

As will be appreciated, in aspects of the present technology where it may be desirable for the ultrasound transducer 101 to hold its charge, the ultrasound transducer 101 may be a CUT. In such aspects, a resistive ultrasound transducer may not operate properly.

It should be understood that, although the controller 336 may be configured to control the pulser 220 based on the P/N signal and the sel_threshold signal, as described above in connection with FIG. 3, in contrast the pulsing circuit 103 is not limited in this respect. Accordingly, any signal or combination of signals configured to control the pulser 220 to hold, increase, or decrease a value of the input signal 240 until a threshold voltage is reached, or until a value within a predetermined range of the threshold voltage is reached, may also be employed.

Figure 4:
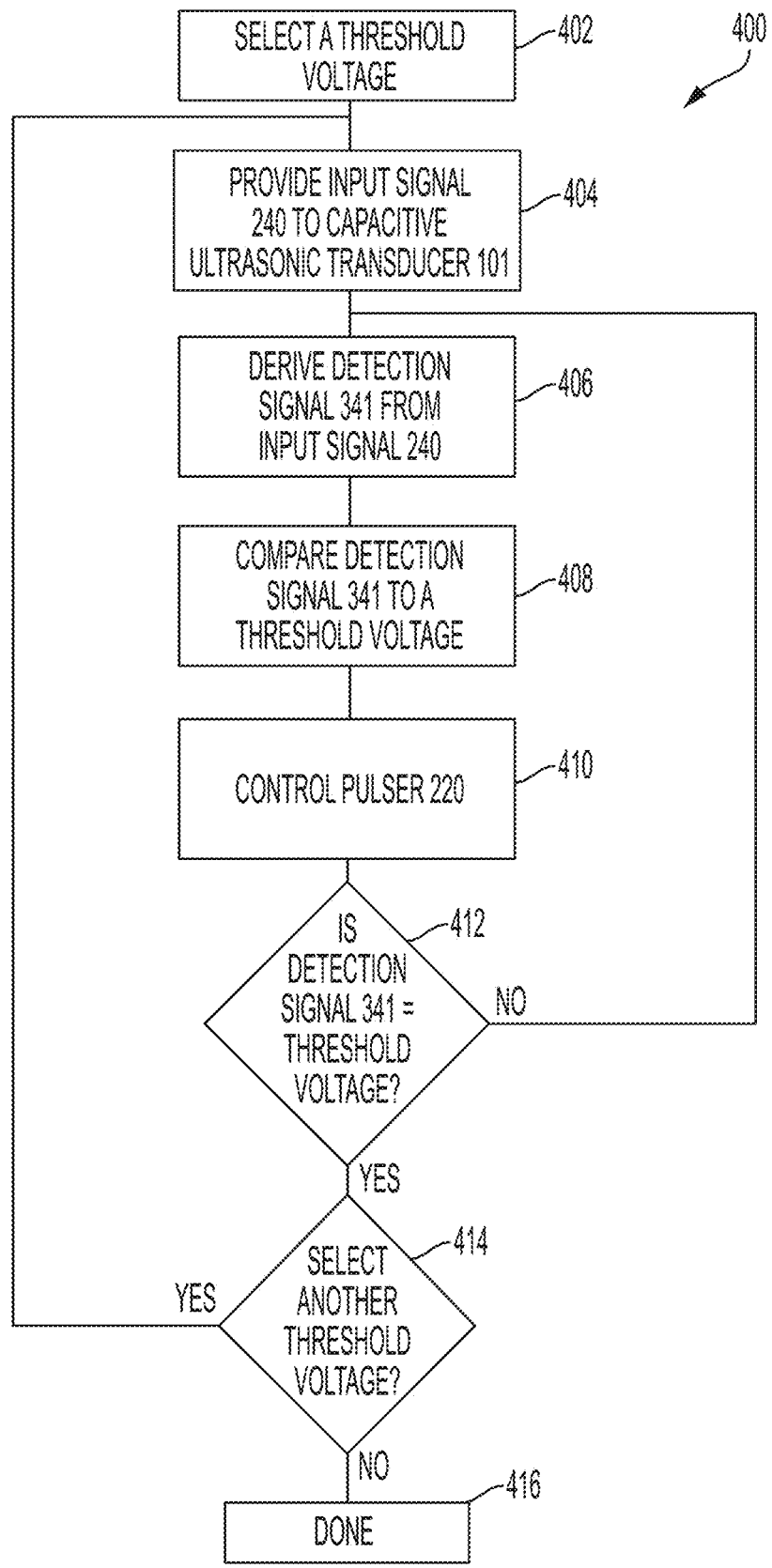
FIG. 4 is a block diagram illustrating the acts of a method to operate a pulsing circuit coupled to a capacitive ultrasonic transducer.

FIG. 4 is a flow diagram illustrating a method 400 to operate the pulsing circuit 103 to drive a CUT 101, according to aspects of the present technology. The method 400 of FIG. 4 may be performed in connection with the pulsing circuit 103 illustrated in FIG. 2 or the implementation of the pulsing circuit 103 illustrated in FIG. 3. The method 400 may start at an act 402 in which a threshold voltage may be selected from among a set of n selectable threshold voltages, where n may assume any suitable value greater than two. In some aspects, the threshold voltage may be selected via a digital signal having m bits, where n has a value that is equal to or less than $2^m$.

The method 400 may continue to an act 404 in which the input signal 240 may be provided by the pulser 220 to the CUT 101. According to an aspect of the present technology, the pulser 220 may be configured to provide a bipolar input signal, which may exhibit positive and/or negative voltages. As mentioned above, bipolar input signals of the type described herein may lead to echo signals that do not saturate the receiving circuits $109_1 \ldots 109_N$ of the ultrasound device 100.

According to another aspect of the present technology, the pulser 220 may be configured to provide a multi-level pulse, which may exhibit values selected from among multiple selectable values. As discussed above, pulsing circuits capable of generating multi-level pulses may facilitate time-domain and space-domain apodization, which may lead to enhanced image contrast. The generation of multi-level pulses of the type described herein may be facilitated by feedback circuits designed to provide a threshold voltage selected from a set of threshold voltages, without resorting to use of additional voltage supply circuits, which may increase the size of handheld ultrasound probes and consequently render such probes harder to manage and thus less user friendly.

At an act 406, the detection signal 341 may be derived from the input signal 240. The detection signal 341 may represent the input signal 240. For example, the detection signal 341 may be equal to or proportional to the input signal 240.

At an act 408, the detection signal 341 may be compared to the threshold voltage selected at the act 402. In some aspects of the present technology, the detection signal 341 may be proportional to the input signal 240 by a scaling factor. In such aspects, the selected threshold voltage may be scaled to the input signal 240 by the same scaling factor. As a result of the comparison, the detection signal 341 may be determined to be equal to, greater than, or less than the selected threshold voltage.

At an act 410, based on the result of the comparison performed at the act 408, the control signal 242 may be provided to the pulser 220 to control the input signal 240. The control signal 242 may be provided by the feedback circuit 230, which may be controlled digitally.

At an act 412, if the detection signal 341 is determined to have a value that is less than the selected threshold voltage, the control signal 242 may control the pulser 220 to increase a voltage corresponding to the input signal 240. In some aspects of the present technology, the control signal 242 may cause the pMOS transistor 322 to go into a conductive state to charge a capacitance associated with the CUT 101.

At the act 412, if the detection signal 341 is determined to have a value that is greater than the selected threshold voltage, the control signal 242 may control the pulser 220 to decrease the voltage corresponding to the input signal 240. In some aspects of the present technology, the control signal 242 may cause the nMOS transistor 324 to go into a conductive state to discharge, or negatively charge, the capacitance associated with the CUT 101.

Unless it is determined, at the act 412, that the detection signal 341 has a value that is equal to or within a predefined range of the selected threshold voltage, the method 400 may return to the act 406. That is, the method 400 may repeat in one or more loops until the detection signal 341 is determined to have a value that is equal to or within a predefined range of the selected threshold voltage.

At the act 412, if detection signal 341 is determined to have a value that is equal to or within a predefined range of the selected threshold voltage, the control signal 242 may control the pulser 220 to hold a current value of the input signal 240. In some aspects of the present technology, the control signal 242 may cause the nMOS transistor 324 and the pMOS transistor 322 to go into a cutoff state to allow the capacitance associated with the CUT 101 to retain its current electric charge. The predefined range may be within 10% of the selected threshold voltage, within 5% of the selected threshold voltage, or within any suitable predefined range.

Once the input signal 240 has reached a value corresponding to the selected threshold voltage, the method 400 may proceed to an act 414 in which another threshold voltage may be selected from among the n selectable threshold voltages. If another threshold voltage is selected at the act 414, the method 400 may loop back to the act 404 and repeat for the newly selected threshold voltage. Selection of the new threshold voltage may be performed asynchronously. If no new threshold voltage is selected at the act 414, the method 400 may end at the act 416.

Figure 5B:
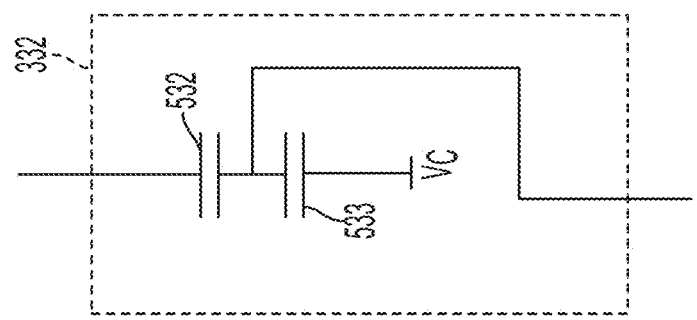
FIG. 5B is a circuit diagram illustrating a dividing circuit configured to generate a detection signal.
Figure 5A:
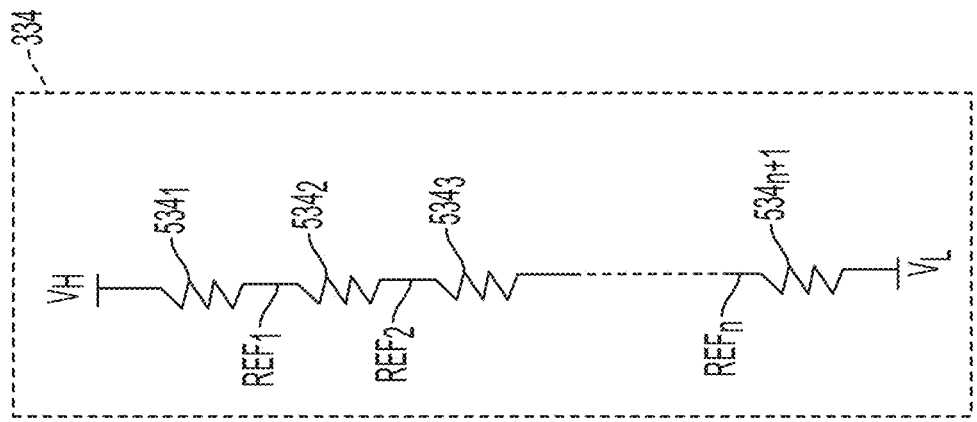
FIG. 5A is a circuit diagram illustrating a resistive ladder configured to generate a plurality of threshold voltages.

FIG. 5A is a circuit diagram illustrating an example of the reference generator 334 of FIG. 3, according to aspects of the present technology. The reference generator 334 may comprise a resistive ladder, configured to generate n threshold voltages $REF_1 \ldots REF_n$, where n may assume any value greater than two. In some aspects, the resistive ladder may comprise n+1 resistors $534_1 \ldots 534_{n+1}$ connected in series. The resistor $534_{n+1}$ may be coupled to a supply voltage $V_H$, which may be equal to the supply voltage $V_P$ shown in FIG. 3. The resistor $534_{n+1}$ may be coupled to a supply voltage $V_L$, which may be equal to the supply voltage $V_N$ shown in FIG. 3.

In some aspects of the present technology, the n+1 resistors $534_1 \ldots 534_{n+1}$ all may have equal resistances to divide a voltage range of from $V_H$ to $V_L$ into n equal segments. In other aspects of the present technology, the resistors $534_2 \ldots 534_{n+1}$ may have resistances equal to R while the resistor $534_1$ may have a resistance equal to xR, where x may assume any value between 0.01 and 100. As will be appreciated, other values for x are also possible. In such other aspects, a scaled voltage range proportional to the voltage range of from $V_H$ to $V_L$ may be divided into n equal segments.

FIG. 5B is a circuit diagram illustrating an example of the dividing circuit 332 of FIG. 3, according to aspects of the present technology. The dividing circuit 332 may comprise a capacitive divider configured to generate a signal (the detection signal 341) that is proportional to the input signal 240. The capacitive divider may comprise a pair of capacitors 532, 533. The capacitor 532 may have one terminal coupled to an output of the pulser 220 and one terminal coupled to an input of the controller 336. In some aspects, the capacitor 532 may be configured to receive the input signal 240 generated from by the pulser 220. The capacitor 533 may have one terminal coupled to the input of the controller 336 (same as for the capacitor 532) and one terminal coupled to a supply voltage $V_C$. In some aspects, the capacitor 533 may be configured to receive a scaled version of the input signal 240. In some aspects, the supply voltage $V_C$ may be equal to the supply voltage $V_N$ shown in FIG. 3. The capacitance of the capacitors 532 and 533 may be configured to scale with the detection signal 341 by the same scaling factor by which the threshold voltages of FIG. 5A are scaled. In such aspects, the detection signal 341 may be directly compared to a threshold voltage selected from among the n threshold voltages without having to scale any of the two signals first, as discussed above.

FIG. 6A illustrates an example of a timing diagram 600 for signals that may be provided by the pulsing circuit 103 to the CUT 101, according to an aspect of the present technology. In particular, the timing diagram 600 illustrates an example of a target signal 602 and an example of the input signal 240. In this aspect, a threshold voltage may be selected from among seven threshold voltages. The target signal 602 may represent a voltage signal that is to be followed or mimicked by the input signal 240, which may be a voltage signal. If the input signal 240 is equal to the target signal 602, for example at a time $t_1$, then the detection signal 341 may have a voltage value that is equal to the current threshold voltage. In this case, the feedback circuit 230 may control the pulser 220 to keep the input signal 240 constant at the current value of the input signal 240, in order to keep the input voltage constant. If the input signal 240 has a voltage value that is less than a voltage value of the target signal 602, for example at a time $t_2$, the feedback circuit 230 may control the pulser 220 to increase the voltage value of the input signal 240 until the voltage value of the target signal 602 is reached. If the input signal 240 has a voltage value that is greater than a voltage value of the target signal 602, for example at a time $t_3$, the feedback circuit 230 may control the pulser 220 to decrease the voltage value of the input signal 240 until the current target voltage is reached. In some embodiments, the target signal 602 may be varied asynchronously. Consequently, a duration of each segment of the target signal 602 may be set independently from durations of other segments.

In some aspects of the present technology, the pulsing circuit 103 may be configured to generate an input signal 240 having a DC component that is greater than zero. The extent of the DC component may be chosen to bias a receiving circuit (e.g., the receiving circuit $109_1$) without letting the receiving circuit reach saturation.

In some aspects of the present technology, the input signal 240 may overshoot and have a voltage value that is greater than a voltage value of the target signal 602 (not shown in FIG. 6A). With such an overshoot, the feedback circuit 230 may attempt to mitigate the effects of the overshoot. That is, the feedback circuit 230 may be configured to skew the threshold voltage. In some aspects of the present technology, the threshold voltage may be skewed by adding (or subtracting) a voltage offset to the threshold voltage. For example, if the desired output voltage is x volts, the threshold voltage may be set to y volts, such that the difference between x and y is equal to the overshooting voltage. In some embodiments, the threshold voltage may be skewed through a non-uniform resistive ladder.

FIG. 6B illustrates an example of a timing diagram 620 for an apodized signal that may be provided by the pulsing circuit 103 to the CUT 101, according to an aspect of the present technology. In particular, the timing diagram 620 illustrates an example of an apodized target signal 604 and an apodized input signal 240. The feedback circuit 230 may be configured to perform time-domain apodization of the input signal 240 based on a Gaussian window, a Hamming window, a flat top window, a cosine window, or any suitable window function. Multi-level pulses of the type described herein may provide a sufficient degree of granularity to faithfully generate continuous window functions.

Figure 7:
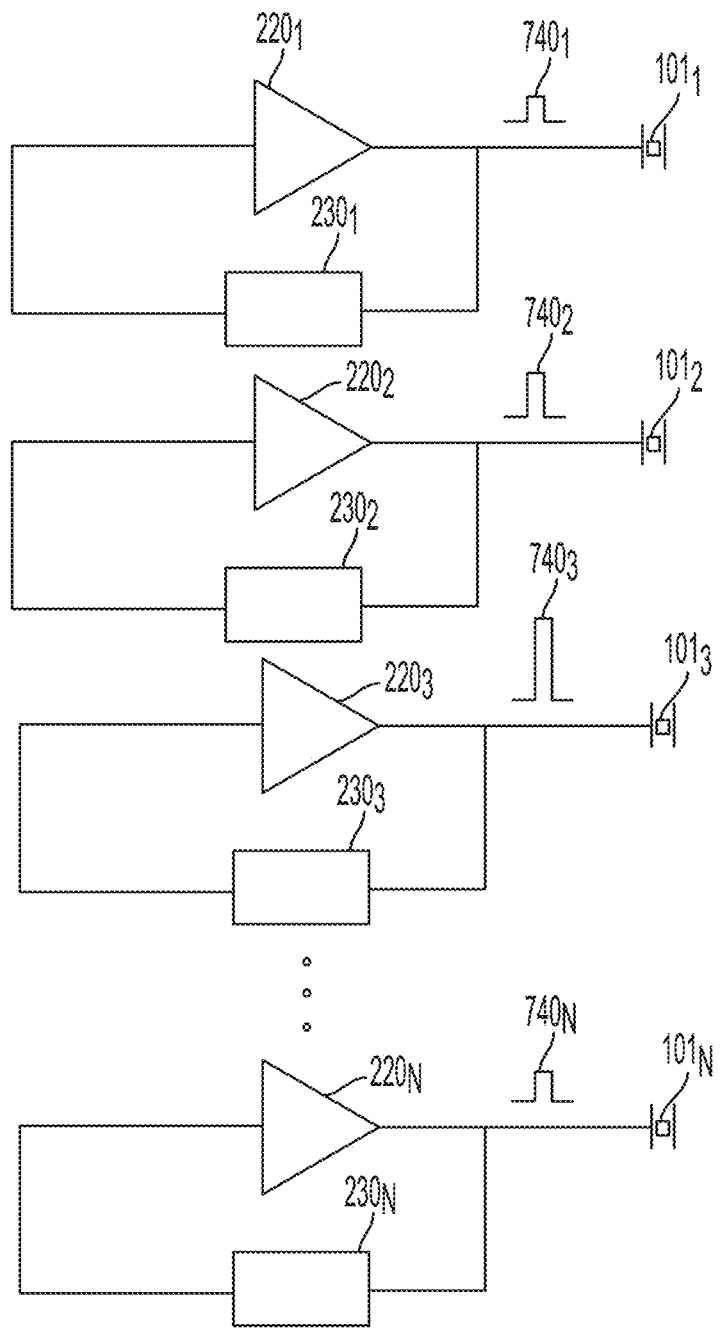
FIG. 7 is a block diagram illustrating a plurality of pulsing circuits coupled to a plurality of capacitive ultrasonic transducers.

FIG. 7 is a block diagram illustrating a plurality of pulsing circuits coupled to a plurality of CUTs $101_1$, $101_2$, $101_3$ ... $101_N$, according to aspects of the present technology. In some aspects, the CUTs $101_1$, $101_2$, $101_3$ ... $101_N$ may be arranged to form a one-dimensional (1D) array. In other aspects, the CUTs $101_1$ ... $101_N$ may be arranged to form a two-dimensional (2D) array. The CUTs $101_1$ ... $101_N$ may be coupled to output terminals of respective pulsers $220_1$, $220_2$, $220_3$ ... $220_N$, as schematically shown in FIG. 7. Feedback circuits $230_1$, $230_2$, $230_3$, ... $230_N$ may be coupled respectively to input terminals of the pulsers $220_1$ ... $220_N$ and may also be coupled respectively to the output terminals of the pulsers $220_1$, $220_2$, $220_3$ ... $220_N$, respectively, as shown in FIG. 7. In some aspects, the feedback circuits $230_1$ ... $230_N$ may be separate circuits. In other aspects, the feedback circuits $230_1$ ... $230_N$ may be part of a single circuit configured to control the pulsers $220_1$ ... $220_N$.

As illustrated in FIG. 7, the feedback circuits $230_1$ ... $230_N$ may control the pulsers $220_1$ ... $220_N$ to generate input signals $740_1$, $740_2$, $740_3$, ... $740_N$ that exhibit amplitudes that are space-dependent. In some aspects of the present technology the feedback circuits $230_1$ ... $230_N$ may control the pulsers $220_1$ ... $220_N$ to perform space-domain apodization of the input signals $740_1$, $740_2$, $740_3$, ... $740_N$. For example, the input signals $740_1$ ... $740_N$ may exhibit amplitudes that are larger at the center of the array and decay, following a predefined profile, towards the edge of the array. The space-domain apodization function may be for a Gaussian window, a Hamming window, a flat top window, a cosine window, or any suitable window. Space-domain apodization may be performed over one spatial dimension or two spatial dimensions. By performing space-domain apodization, the aperture of the window may be effectively varied, thus providing means to optimize the spatial profile of the emitted ultrasound wave. In some aspects of the present technology, the spatial profile may be optimized to minimize spatial side-lobes. Ultrasound devices capable of emitting spatial profiles that have minimal, or suppressed, side-lobes may exhibit an enhanced spatial resolution and hence an increased image contrast.

In some aspects of the present technology, the CUT 101 may be connected to transmit circuitry and receive circuitry. During transmission, a bipolar input signal generated by the pulsing circuit 103 may inadvertently couple to a receiving circuit of the receive circuitry. The receiving circuit may comprise, in some aspects, components that are not designed to withstand large positive and negative voltage signals of the type generated by the pulser 220. Accordingly, coupling bipolar pulses directly into the receiving circuit may have detrimental effects that may lead to damaging of one or more components of the receive circuitry.

According to aspects of the present technology, a symmetric switch is provided to decouple a receiving circuit from a transmitting circuit while bipolar pulses are being generated. For the purposes of the present technology, a symmetric switch may be a transistor-based switch that may have input and output terminals of a same type. For example, the input and output terminals of the symmetric switch may both be sources, or both be drains, or both be emitters, or both be collectors, or both be other terminal types.

Figure 8B:
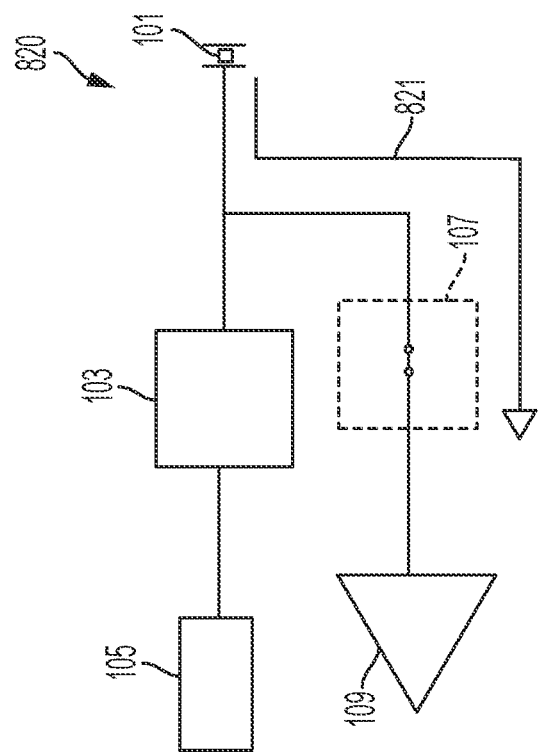
FIG. 8B is a block diagram illustrating an ultrasound device operating in receive mode.
Figure 8A:
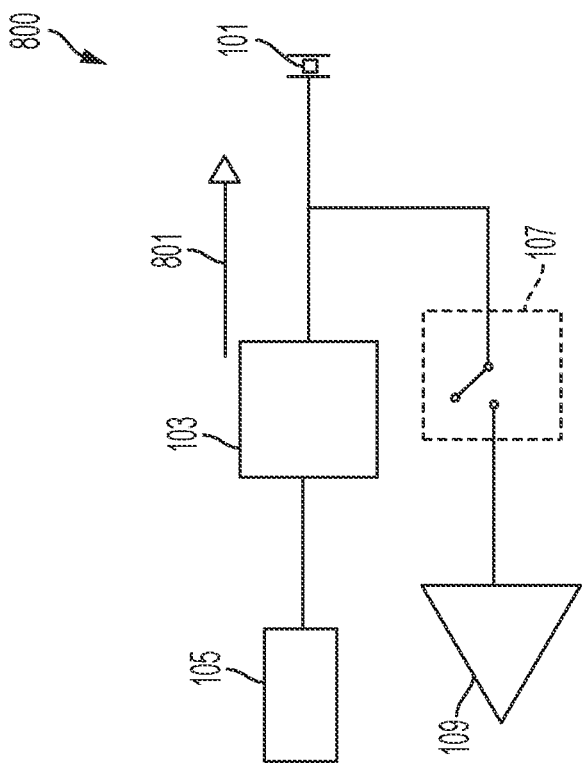
FIG. 8A is a block diagram illustrating an ultrasound device operating in transmit mode.

FIG. 8A and FIG. 8B are block diagrams illustrating an ultrasound device operating in transmit mode and receive mode, respectively, according to a aspects of the present technology. A symmetric switch 107 may comprise an input terminal connected to the output terminal of the pulsing circuit 103. In some aspects, the input terminal of the symmetric switch 107 may be connected to the output terminal of the pulser 220 of the pulsing circuit 103. The input terminal of the symmetric switch 107 may be further connected to a terminal of the CUT 101. In some aspects, the input terminal of the symmetric switch 107 may be coupled between the output terminal of the pulser 220 and the terminal of the CUT 101. The symmetric switch 107 also may comprise an output terminal coupled to the input terminal of the receiving circuit 109. In some aspects, the receiving circuit 109 comprises a current-to-voltage converter configured to convert a current, which may be generated by the CUT 101 in response to receiving an echo signal from reflected ultrasonic waves, to a voltage. In some aspects, the current-to-voltage converter may comprise a trans-impedance amplifier (TIA).

As illustrated in FIG. 8A, in the transmit mode (TX mode), the symmetric switch 107 may be configured to provide a high impedance to decouple pulses generated by the pulsing circuit 103 from the receiving circuit 109. In some aspects, the symmetric switch 107 may be configured to operate as an open circuit during the transmit mode. An arrow 801 shown in FIG. 8A may represent a signal-path direction corresponding to the input signal 240 during the transmit mode.

As illustrated in FIG. 8B, in the receive mode (RX mode), the symmetric switch 107 may be configured to provide a low impedance to couple the CUT 101 to the receiving circuit 109, so that the receiving circuit 109 may receive a current generated by the CUT 101 in response to receiving an echo signal from reflected ultrasonic waves. In some aspects of the present technology, the symmetric switch 107 may be configured to short-circuit the receiving circuit 109 to the CUT 101 during the receive mode. In some aspects, the pulsing circuit 103 may be configured to be in a high-impedance state during the receive mode. An arrow 821 shown in FIG. 8B may represent a signal-path direction corresponding to a signal from the CUT 101 during the receive mode.

Figure 9:
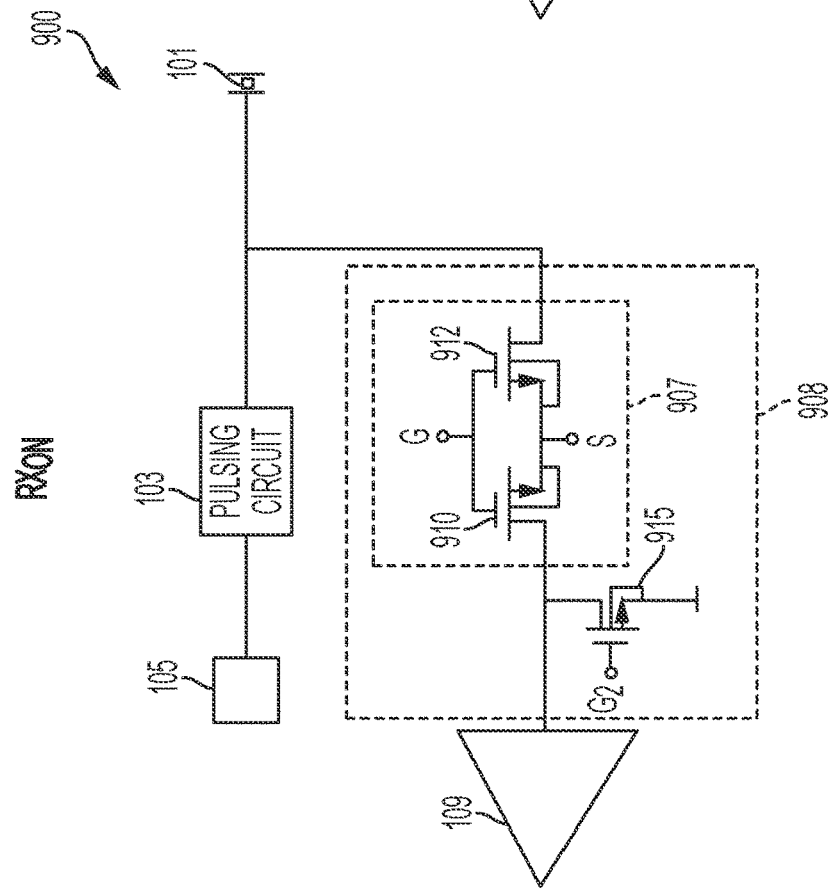
FIG. 9 is a block diagram illustrating an ultrasound device comprising a symmetric switch.

FIG. 9 is a block diagram schematically illustrating an example of an ultrasound device 900 comprising a symmetric switch 907, according to aspects of the present technology. The symmetric switch 907 may be configured to block positive and negative voltages associated with bipolar pulses generated by the pulsing circuit 103 during the transmit mode from reaching the receiving circuit 109, thus preventing damage to the receiving circuit 109.

In some aspects of the present technology, the symmetric switch 907 may comprise two transistors 910, 912. However, in other aspects, the symmetric switch 907 may comprise any suitable number of transistors configured to block bipolar pulses during the transmit mode. The transistors 910, 912 may be of any type, such as metal-oxide-semiconductor field effect transistors (MOSFETs) including nMOS or pMOS, junction field effect transistors (JFETs), bipolar junction transistors (BJTs), metal-semiconductor field effect transistors (MESFETs), insulated gate field effect transistors (IGFETs), laterally diffused metal-oxide-semiconductor transistors (LDMOS), or any suitable combination thereof.

In some aspects of the present technology, both of the transistors 910, 912 are nMOS transistors. The gate of the transistor 910 may be short-circuited to the gate of transistor 912. In an aspect, a second terminal of transistor 910, other than the gate, may be short-circuited to a second terminal of the transistor 912, other than the gate. For example, the source of the transistor 910 may be short-circuited to the source of the transistor 912. A third terminal of the transistor 912 (e.g., the drain) may be coupled between the output terminal of pulsing circuit 103 and a terminal of the CUT 101. A third terminal of transistor 910 (e.g., the drain) may be coupled to the input terminal of the receiving circuit 109. For example, the drain of the transistor 910 may be short-circuited to the input terminal of receiving circuit 109. In some aspects of the present technology, the body terminal of the transistor 910 may be short-circuited to the source of the transistor 910, and the body terminal of the transistor 912 may be short-circuited to the source of the transistor 912.

In some aspects of the present technology, a switching circuit 908 comprising the symmetric switch 907 may be used to block bipolar pulses during the transmit mode. In addition to the symmetric switch 907, the switching circuit 908 may comprise a transistor 915. The transistor 915 may be any suitable type of transistor, such as an nMOS transistor, for example. The transistor 915 may be configured to have the drain short-circuited to the input terminal of the receiving circuit 109. The source of the transistor 915 may be short-circuited to a ground terminal. The body terminal of the transistor 915 may be short-circuited to its source.

Figure 11:
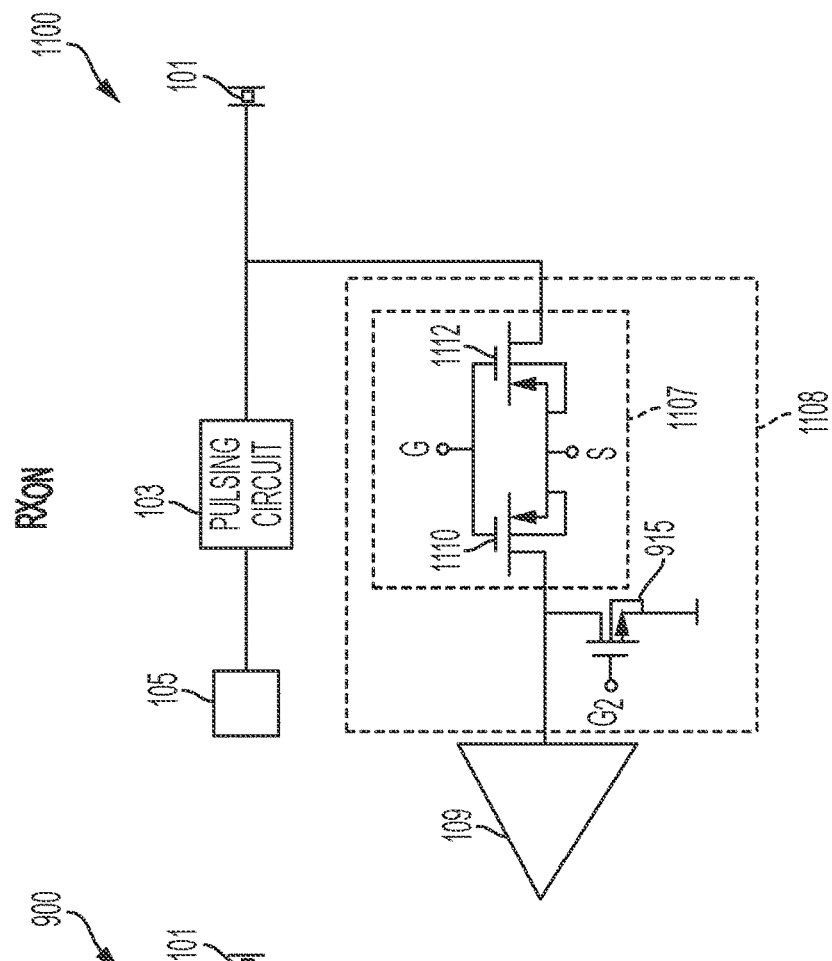
FIG. 11 is a block diagram illustrating an alternative device comprising a symmetric switch.

In some aspects of the present technology, schematically shown in FIG. 11, a symmetric switch 1107 may comprise pMOS transistors 1110, 1112. As will be appreciated, in other aspects of the present technology, a symmetric switch may comprise a different number of pMOS transistors.

The symmetric switch 1107 may be configured such that the gate of the transistor 1110 may be short-circuited to the gate of the transistor 1112. In some aspects of the present technology, a second terminal of the transistor 1110, other than the gate, may be short-circuited to a second terminal of the transistor 1112, other than the gate. For example, the source of the transistor 1110 may be short-circuited to the source of transistor 1112. A third terminal of the transistor 1112 (e.g., the drain) may be coupled between the output terminal of the pulsing circuit 103 and a terminal of the CUT 101. A third terminal of the transistor 1110 (e.g., the drain) may be coupled to the input terminal of the receiving circuit 109. In some aspects, the drain of the transistor 1110 may be short-circuited to the input terminal of the receiving circuit 109. In some aspects, the body terminal of the transistor 1110 may be short-circuited to the source of the transistor 1110, and the body terminal of the transistor 1112 may be short-circuited to the source of the transistor 1112. In some aspects, a switching circuit 1108 may comprise the symmetric switch 1107 and a transistor 915.

Figure 10:
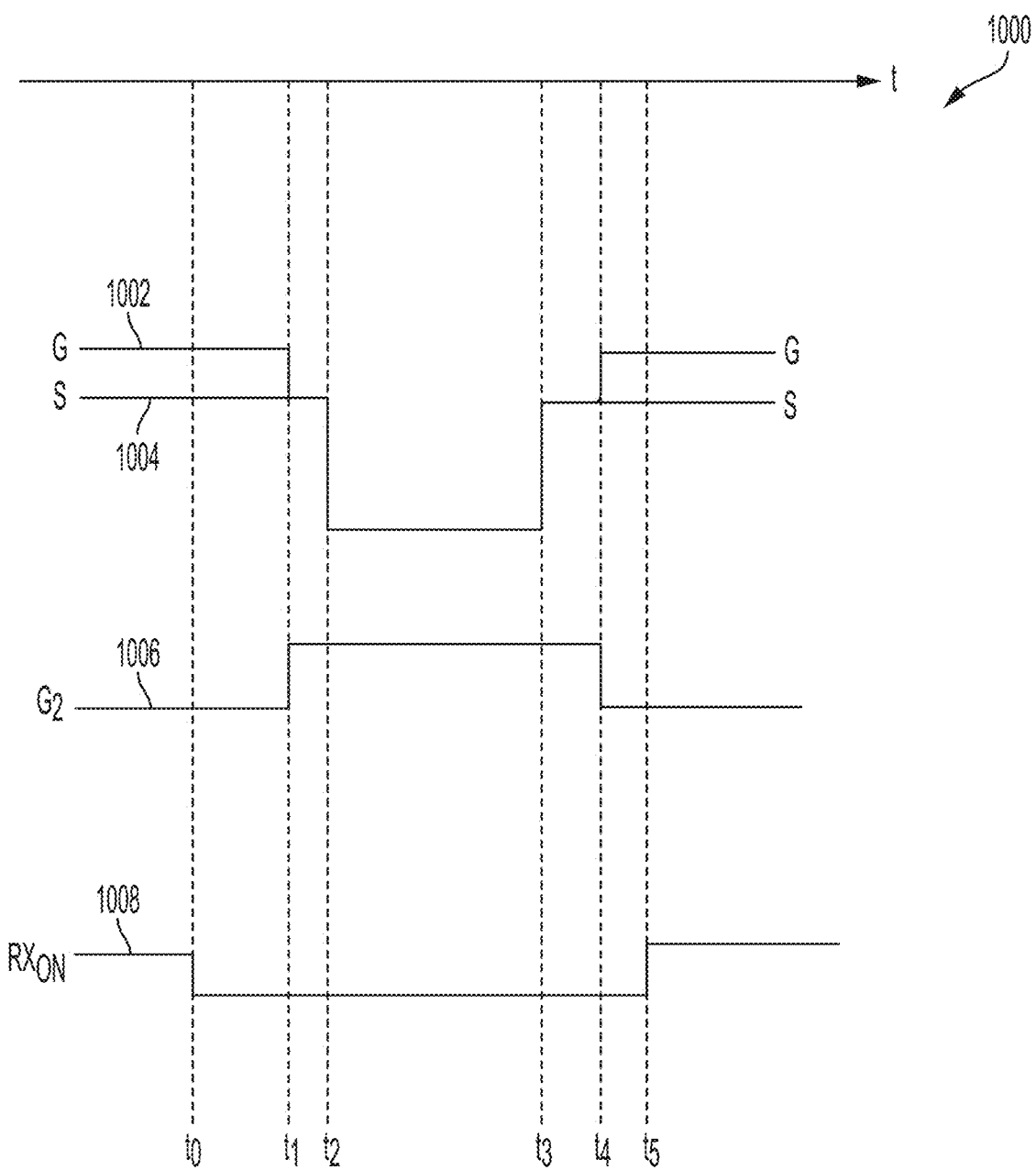
FIG. 10 illustrates a timing diagram showing control signals configured to drive the symmetric switch of FIG. 9.

Returning to FIG. 9, the switching circuit 908 may be controlled by any suitable type and number of control signals configured to block bipolar pulses generated by the pulsing circuit 103 during the transmit mode, and further may be configured to couple the CUT 101 to the receiving circuit 109 during the receive mode. FIG. 10 illustrates an example of a timing diagram 1000 showing examples of control signals that may be used to drive the symmetric switch 907 of FIG. 9, according to an aspect of the present technology. A control signal 1002 may be used to control the gates G of the transistors 910, 912. A control signal 1004 may be used to control the sources S of the transistors 910, 912. A control signal 1006 may be used to control the gate $G_2$ of the transistor 915. In some aspects of the present technology, a control signal 1008 may be used to turned on and off the receiving circuit 109. For example, the control signal 1008 may be used to enable or to disable a voltage supply of the receiving circuit 109, thus enabling or disabling the receiving circuit 109.

Before a time $t_0$, the switching circuit 908 may be configured to operate in the receive mode. During this period, the control signal 1002 may be greater than the control signal 1004. In some aspects of the present technology, both the control signal 1002 and the control signal 1004 may be greater than zero. In this way, both the transistors 910, 912 may have a gate-source voltage greater than zero and hence may be configured to conduct electrical currents. The control signal 1006 may be zero or below a threshold voltage of the transistor 915, such that the transistor 915 may be maintained in a cutoff state. In an aspect, the control signal 1008 may be set to a value that enables the receiving circuit 109.

Between the time $t_0$ and a time $t_1$, the control signal 1008 may be set to a value that disables the receiving circuit 109.

Between the time $t_1$ and a time $t_2$, the control signal 1002 may be set to a value equal to the control signal 1004; consequently, the transistors 910, 912 may go into a cutoff state. In some aspects of the present technology, the control signal 1006 may be set to a value above the threshold voltage of the transistor 915; consequently, the input terminal of the receiving circuit 109 may be forced to a voltage equal to zero.

Between the time $t_2$ and a time $t_3$, the control signals 1002, 1004 may be set to a negative voltage. In some aspects of the present technology, the control signals 1002, 1004 may be set to the negative voltage simultaneously. In some aspects, the negative voltage may be equal to the voltage $V_N$ shown in FIG. 3.

Between the time $t_3$ and a time $t_4$, the control signals 1002, 1004 may be set to zero or to a bias voltage of the pulsing circuit 103. In some aspects of the present technology, the control signals 1002, 1004 may be set to zero or to the bias voltage of the pulsing circuit 103 simultaneously.

Between the time $t_4$ and a time $t_4$, the control signal 1002 may be set to a voltage such that the gate-source voltages of the transistors 910, 912 may be above a threshold for conducting electrical currents. In some aspects of the present technology, the control signal 1006 may be set to a value below the threshold voltage of the transistor 915, so that the voltage associated with the input terminal of the receiving circuit 109 may fluctuate freely.

After the time $t_5$, the control signal 1008 may be set to a value that enables the receiving circuit 109.

In some aspects of the present technology, the receive mode may be defined by the time periods before $t_0$ and after $t_5$ and the transmit mode may be defined by the time period between to and $t_5$, in FIG. 10. In other aspects, the receive mode may be defined by the time periods before $t_1$ and after $t_4$ and the transmit mode may be defined by the time period between $t_1$ and $t_4$, in FIG. 10. In some aspects, $t_0$ may be equal to $t_1$. In some aspects, $t_1$ may be equal to $t_2$. In some aspects, $t_3$ may be equal to $t_4$. In some aspects, $t_4$ may be equal to $t_5$.

FIGS. 12-16D schematically illustrate alternative aspects of the present technology, for protecting receive circuitry of an ultrasound device from being damaged by large voltage signals during transmission of pulses to an ultrasonic transducer of the ultrasound device.

Figure 12:
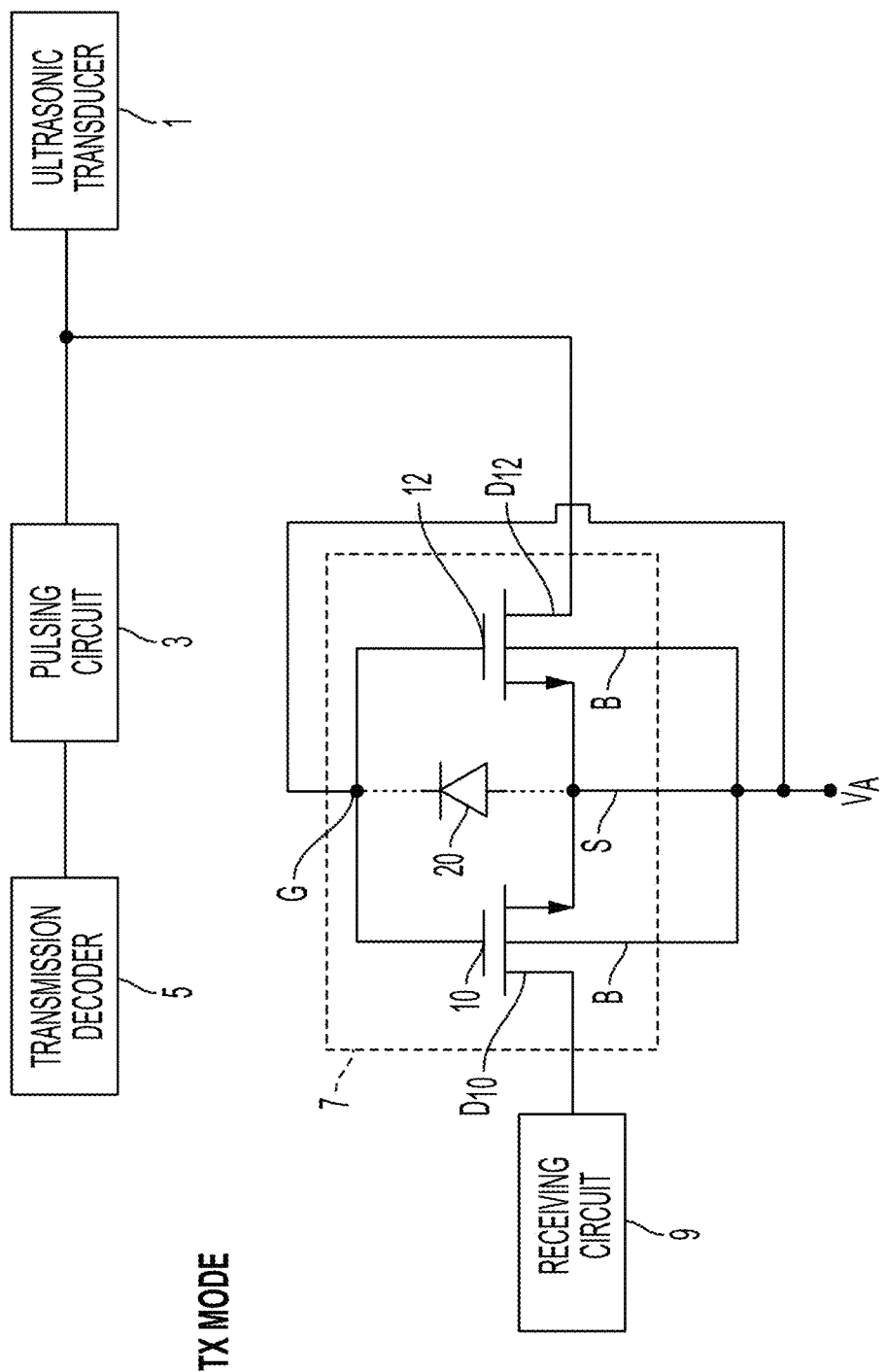
FIG. 12 is a block diagram illustrating an ultrasound device operating in a transmit mode, according to a non-limiting aspect of the present technology.
Figure 13:
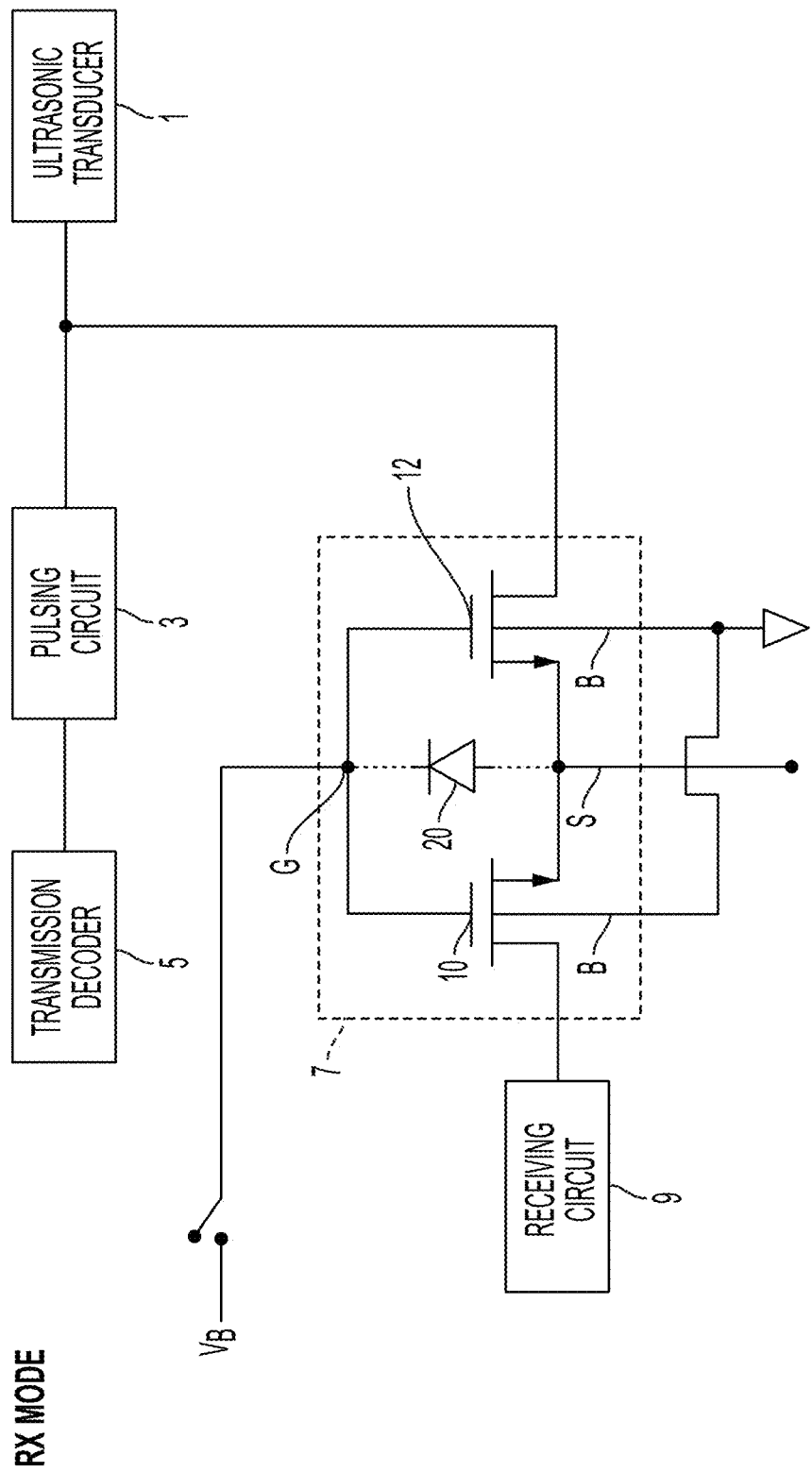
FIG. 13 is a block diagram illustrating an ultrasound device operating in a receive mode, according to a non-limiting aspect of the present technology.

According to an aspect of the present technology, a symmetric switch 7 may be implemented as shown in FIGS. 12 and 13. The symmetric switch may be comprised of first and second transistors 12, 10. A drain $D_{10}$ of the second transistor 10 may be connected to a receiving circuit 9. A drain $D_{12}$ of the first transistor 12 may be connected to an ultrasonic transducer 1. For example, the drain $D_{12}$ of the first transistor 12 may be connected between the ultrasonic transducer 1 and an output terminal of a pulsing circuit 3. An input terminal of the pulsing circuit 3 may be connected to a transmission decoder 5. The pulsing circuit 3 may have a structure similar to the pulsing circuit 103 discussed above, and the transmission decoder 5 may be similar to the transmission decoder 105 discussed above.

In FIGS. 12 and 13, the two transistors 12, 10 are nMOS transistors; however, as will be appreciated, the symmetric switch may be readily adapted for pMOS transistors by a person having ordinary skill in the art.

Optionally, a clamping diode 20 may be connected between the gates G of the first and second transistors 12, 10 and the sources S of the first and second transistors 12, 10, as shown in FIGS. 12 and 13.

During a transmit (TX) mode, the first and second transistors 12, 10 are off, such that the receiving circuit 9 may be isolated from large voltage signals from the pulsing circuit 3. For example, the drain $D_{10}$ may be at 0 V.

As shown in FIG. 12, during the TX mode, the gates of the first and second transistors 12, 10 may be connected together (collectively denoted G). During the TX mode, the sources of the first and second transistors 12, 10 may be connected together (collectively denoted S). During the TX mode, the bodies of the first and second transistors 12, 10 may be connected together (collectively denoted B). In an aspect of the present technology, the sources S, the gates G, and the bodies B may be held at a common potential $V_A$. For example, in the case of nMOS transistors 12, 10, the common potential $V_A$ may be −15 V.

During the TX mode, the pulsing circuit 3 may output bipolar pulses that swing back and forth, from $-V_X$ to $+V_X$ and back. For example, the bipolar pulses may swing from −15 V to +15 V. The receiving circuit 9 may be protected from the voltage swings by the symmetric switch 7.

During a receive (RX) mode, the first and second transistors 12, 10 are on, such that signals from the ultrasonic transducer 1 may reach the receiving circuit 9.

As shown in FIG. 13, during the RX mode, the gates G of the first and second transistors 12, 10 may be connected together. During the RX mode, the sources S of the first and second transistors 12, 10 may be connected together. During the RX mode, the bodies B of the first and second transistors 12, 10 may be connected together. The gates G may be floating at a potential sufficient for the first and second transistors 12, 10 to be on. For example, the gates G may be connected to a potential $V_B$ and then disconnected to enable the gates G to float at the potential $V_B$. In this example, to ensure that the first and second transistors 12, 10 may remain on during the RX mode, the gates G may be connected intermittently to the potential $V_B$. For nMOS transistors, $V_B$ may be +5 V, for example.

During the RX mode, the bodies B of the first and second transistors 12, 10 may be at ground potential or, in the case of nMOS transistors, a potential that is lower than a potential of the gates G; the potential of the bodies B may be floating or fixed below the floating or fixed potential of the gates G. Alternatively, in the case of pMOS transistors, the potential of the bodies B may be floating or fixed above the floating or fixed potential of the gates G.

FIGS. 14A-14C and 15 show example circuit configurations that may be used to incorporate the implementations shown in FIGS. 12 and 13 for the TX and RX modes, and FIGS. 16A-16D shows an example of a timing and state diagram that may be used to understand the states of various circuit elements of FIGS. 12-15.

Figure 14A:
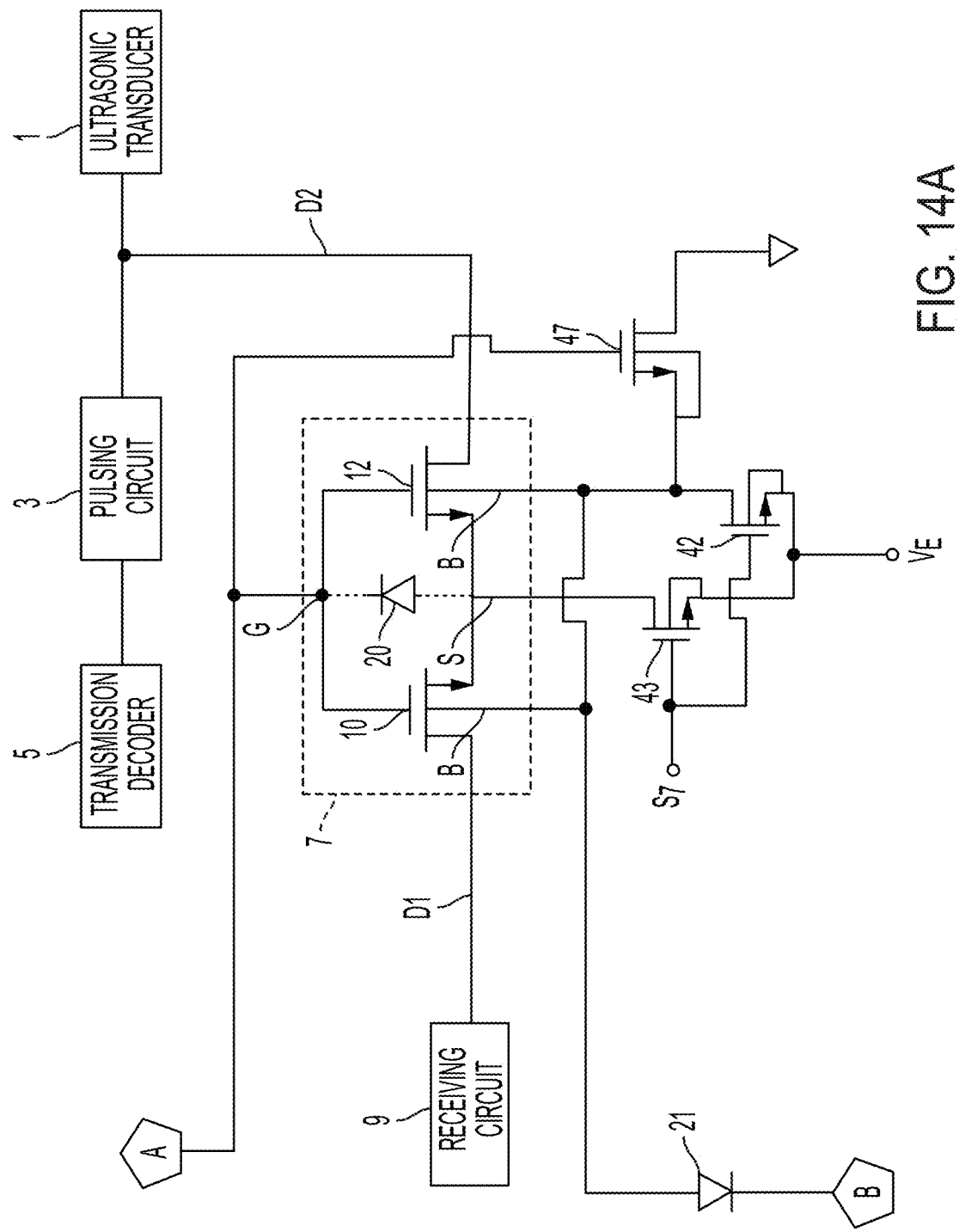
FIG. 14A is a block diagram illustrating an ultrasound apparatus, according to a non-limiting aspect of the present technology.
Figure 14C:
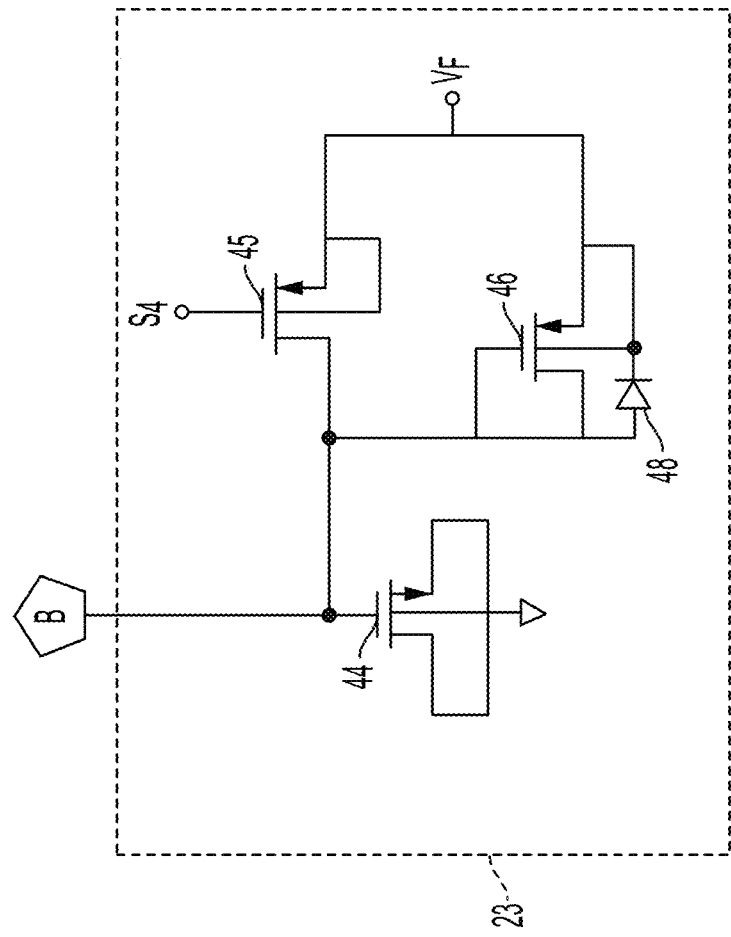
FIG. 14C is a diagram showing a well switch of the ultrasound apparatus of FIG. 14A, according to a non-limiting aspect of the present technology.
Figure 14B:
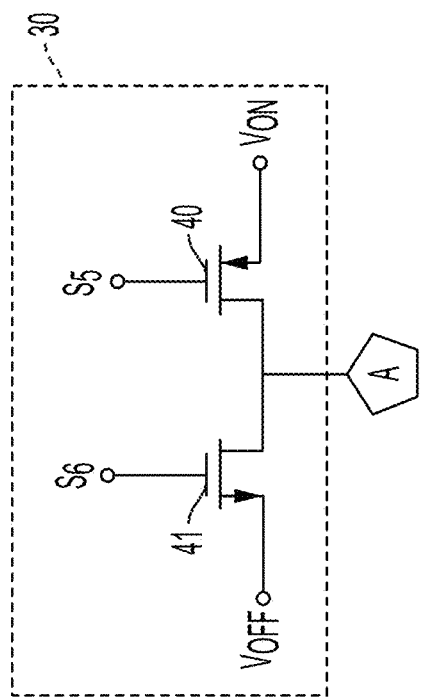
FIG. 14B is a diagram illustrating a gate controller of the ultrasound apparatus of FIG. 14A, according to a non-limiting aspect of the present technology.

According to an aspect of the present technology, shown in FIGS. 14A and 14B, the gates G of the first and second transistors 12, 10 of the symmetric switch 7 may be connected to a gate controller 30. The gate controller 30 may be comprised of a transistor 40 for providing a turn-on voltage $V_{ON}$ to the gates G; a signal $S_5$ may be provided to a gate of the transistor 40 during the RX mode, when the turn-on voltage $V_{ON}$ is to be provided to turn on the transistors 10, 12, 47. That is, the signal $S_5$ may be used to control a transition of the transistors 10, 12, 47 from a non-conductive state to a conductive state. For example, in the case of nMOS transistors 10, 12, $V_{ON}$ may be +5 V. As will be appreciated, $V_{ON}$ may be equivalent to $V_B$ discussed above in connection with FIG. 12. The transistor 40 may be a pMOS transistor.

The gate controller 30 also may be comprised of a transistor 41 for providing a turn-off voltage $V_{OFF}$ to the gates G; a signal $S_6$ may be provided to a gate of the transistor 41 during the TX mode, when the turn-off voltage $V_{OFF}$ is to be provided to the gates G to turn off the transistors 10, 12, 47. That is, the signal $S_6$ may be used to transition the transistors 10, 12, 47 from a conductive state to a non-conductive state. For example, in the case of nMOS transistors 10, 12, $V_{OFF}$ may be −15 V. As will be appreciated, $V_{OFF}$ may be equivalent to $V_A$ discussed above in connection with FIG. 12. The transistor 41 may be an nMOS transistor.

As noted above, a signal from the gate controller 30 to the gates G of the symmetric switch 7 also may be used to control opening and closing of a gate of a transistor 47. The sources S of the symmetric switch 7 may be connected to a transistor 43, and the bodies B of the symmetric switch may be connected to a transistor 42. The transistors 42, 43, may be pMOS transistors, and the transistor 47 may be an nMOS transistor. A signal $S_7$ may be provided to gates of the transistors 42, 43 during the TX mode, to turn on the transistors 42, 43 so that the bodies B and the sources S are set to a potential $V_B$. For example, in the case of nMOS transistors 12, 10, $V_E$ may be −15 V. As will be appreciated, $V_E$ may be equivalent to $V_A$ discussed above in connection with FIG. 12. The transistor 42 may be connected to the transistor 47, as shown in FIG. 14A.

As mentioned above, the symmetric switch 7 may give rise to well capacitances due to a fabricated device structure of the symmetric switch 7 in a semiconductor substrate. For example, the two transistors 12, 10 may be nMOS transistors disposed in a p-doped well ("p-well") in an n-doped substrate ("n-well"). The p-well and the n-well may be high-voltage ("HV") wells, which may give rise to large well capacitances in the signal path. In order to reduce or eliminate noise coupling through the HV n-well, the bodies B of the symmetric switch 7 may be connected to a HV n-well switch 23 via a diode 21, as shown in FIGS. 14A and 14C. The HV n-well switch 23 may function to remove large well capacitances in the signal path during the RX mode.

As shown in FIG. 14C, the HV n-well switch 23 may be comprised of three transistors 44, 45, 46. The transistors 45, 46, may be pMOS transistors, and the transistor 44 may be an nMOS transistor. The HV n-well switch 23 may be maintained at a potential $V_F$ or allowed to float at a potential at or near the potential $V_F$ via an opening or closing of the transistors 45, 46. A signal $S_4$ may be provided to the gate of the transistor 45 to control its opening and closing. Opening and closing of the transistors 44, 46 may be controlled by their connections to the bodies B of the symmetric switch 7 via the diode 21.

Figure 16A:
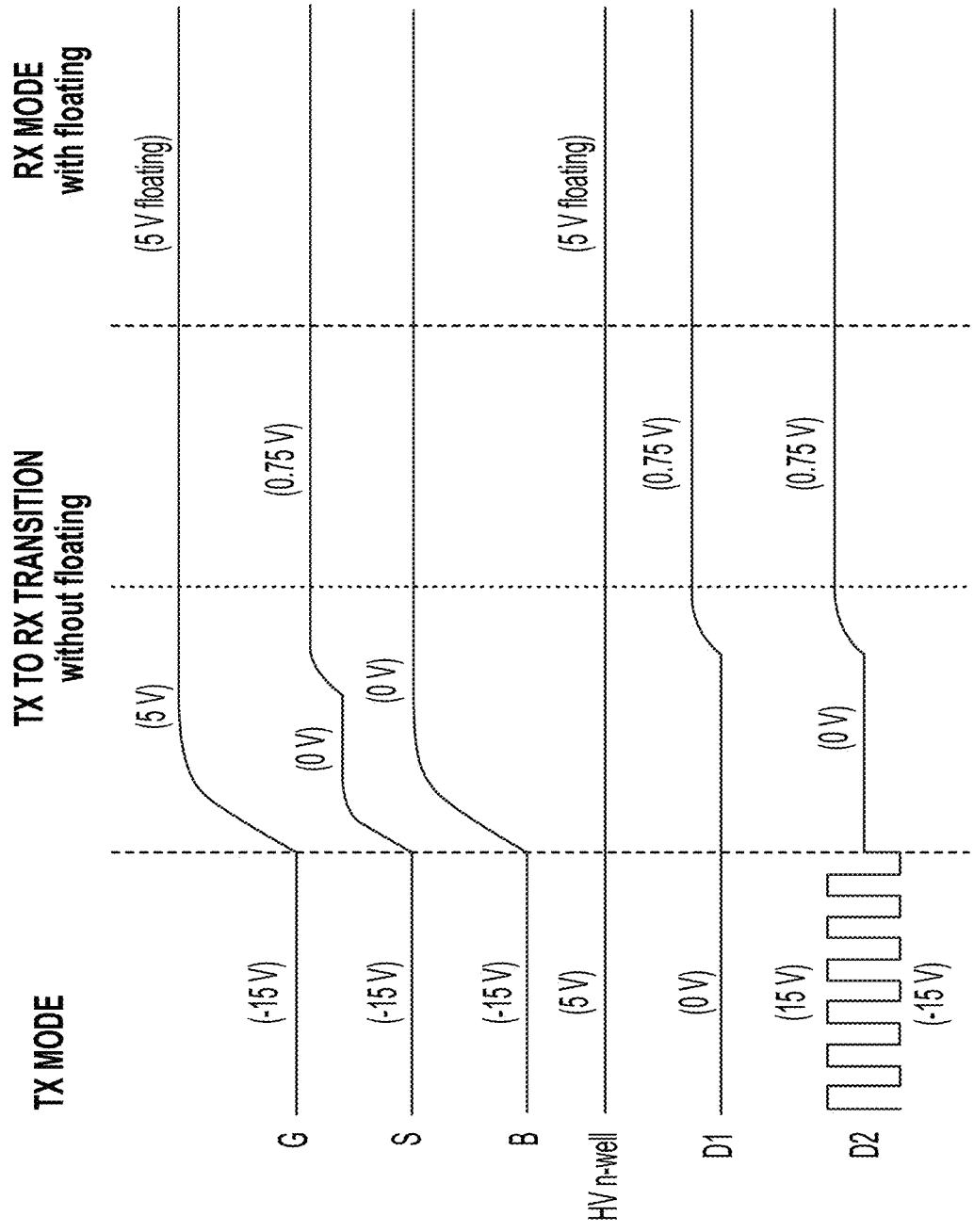
FIG. 16A is timing diagram showing states of some of the elements of the ultrasound apparatus of FIG. 14A during a transmit-mode operation, a receive-mode operation, and a transition from the transmit-mode operation to the receive-mode operation, according to a non-limiting aspect of the present technology.
Figure 16B:
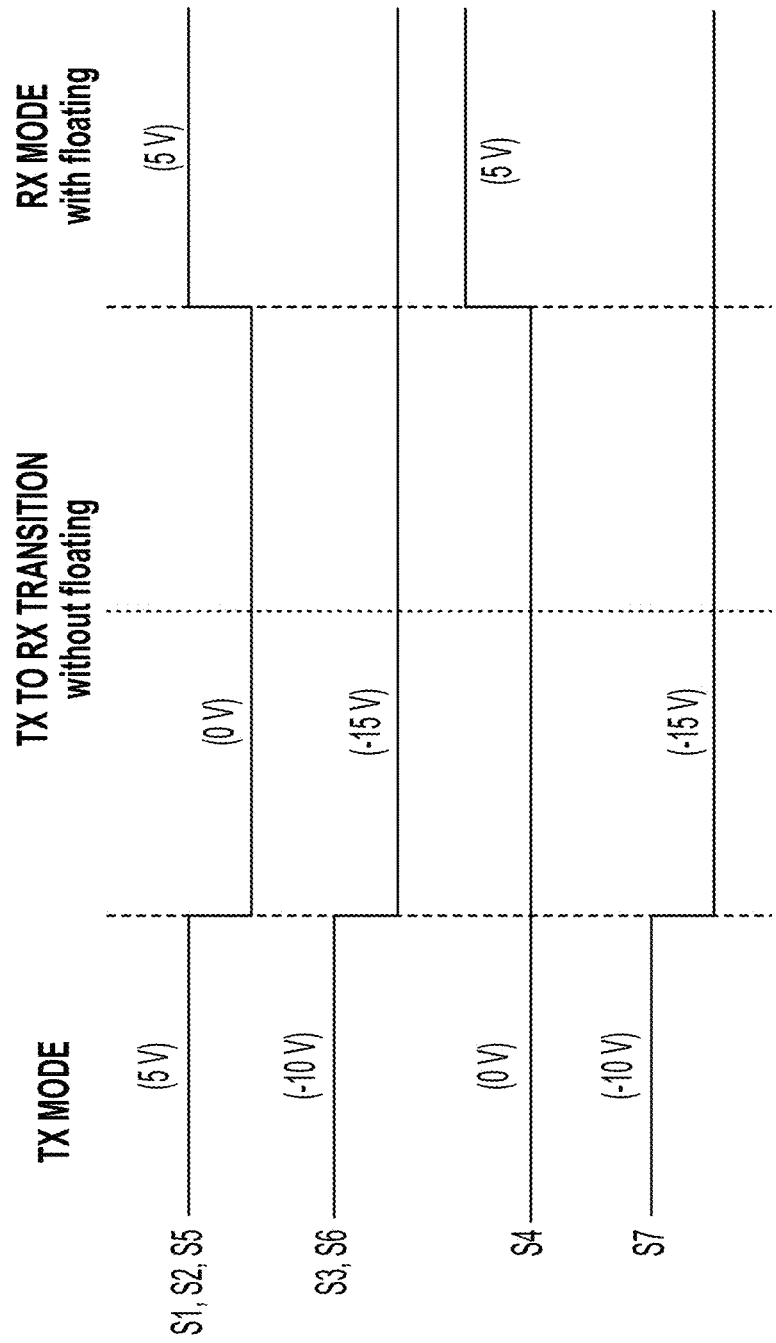
FIGS. 16B-16D are timing diagrams for signals of the ultrasound apparatus of FIG. 14A during a transmit-mode operation, a receive-mode operation, and a transition from the transmit-mode operation to the receive-mode operation, according to non-limiting aspects of the present technology.

As shown in the timing and state diagrams of FIGS. 16A and 16B, during the TX mode, the signal $S_5$ may turn the transistor 40 off and the signal $S_6$ may turn the transistor 41 on, such that the gates G of the symmetric switch 7 may be off (e.g., at a low potential of −15 V). The HV n-well circuit 23 may be at +5 V. The signal $S_7$, which may control the opening and closing of the transistors 42, 43, may be at a potential that is consistent with the sources S being off (e.g., a potential of −10 V). The bodies B and the sources S of the symmetric switch 7 may be driven to the low potential of −15 V via the transistors 42, 43. A voltage at a location D1 between the receiving circuit 9 and the symmetric switch 7 may be at 0 V, and a voltage at a location D2 between the symmetric switch and the pulsing circuit 3 may swing back and forth between the potentials of the two supply voltages used by the pulsing circuit 3 (e.g., +15 V and −15 V).

During a transition from the TX mode to the RX mode, the signal $S_5$ may turn the transistor 40 on and the signal $S_6$ may turn the transistor 41 off, such that the gates G of the symmetric switch 7 may be on and gates G may transition from a potential of −15 V to a potential of +5 V. The signal $S_5$ also may turn the transistor 47 on. The signal $S_7$ may be at a potential to turn off the transistors 42, 43 (e.g., −15 V), such that the bodies B of the symmetric switch 7 may transition to ground potential or 0 V. The voltages at the locations D1, D2 may transition from 0 V to a slightly elevated potential (e.g., +0.75 V).

During the transition from the TX mode to the RX mode, the gates G may not be floating but instead may be set to $V_{ON}$ (e.g., +5 V) by the transistor 40.

During the RX mode, after the transition, the signal $S_5$ may turn the transistor 40 off such that the gates G of the symmetric switch 7 may be floating at a potential of approximately +5 V. The transistor 40 may be controlled by the signal $S_5$ to turn on the transistor 40 intermittently, so that the gates G may remain at approximately +5 V. The signal $S_6$ may not change from the transition, so the transistor 41 may remain off. The signal $S_7$ may remain at the potential of the transition (e.g., −15 V) to keep the transistors 42, 43 off, such that the bodies B of the symmetric switch 7 may remain at ground potential or 0 V, and such that the sources S of the symmetric switch 7 may remain at +0.75 V. The HV n-well switch 23 also may float at +5 V, either independently of the gates G or together with the gates G. The voltages at the locations D1, D2 may remain at +0.75 V while the gates G may be floating.

Figure 15:
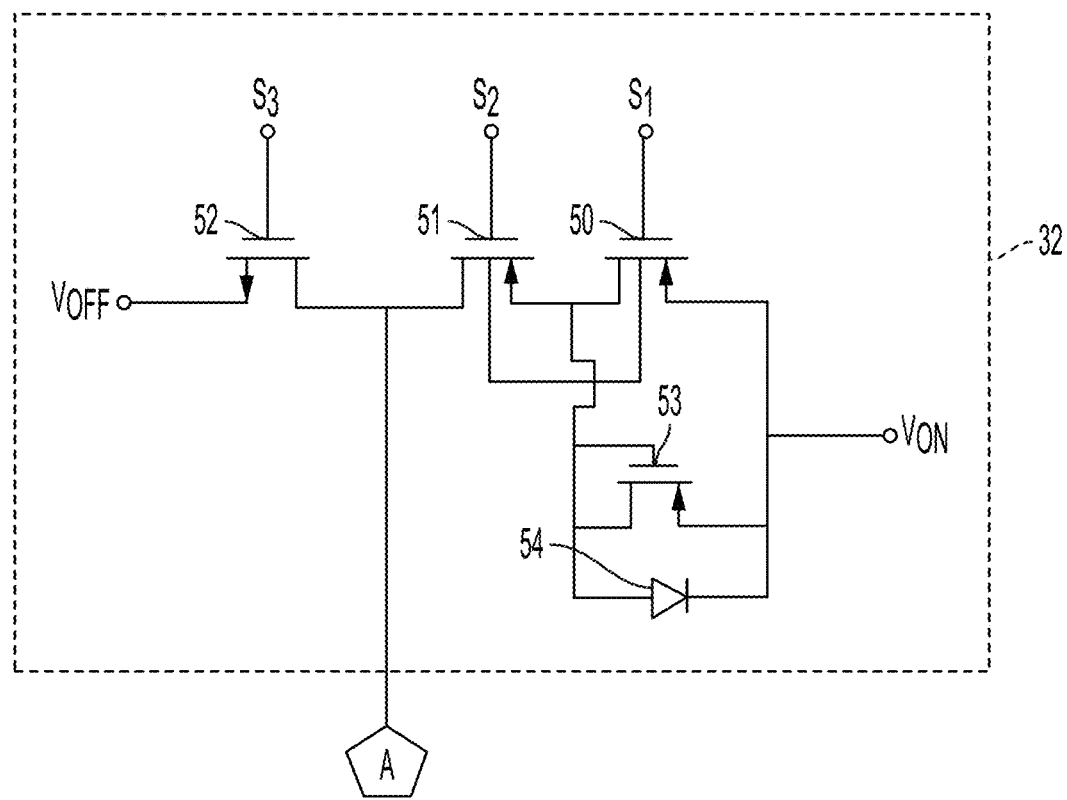
FIG. 15 is a diagram illustrating an alternative gate controller of the ultrasound apparatus of FIG. 14A, according to a non-limiting aspect of the present technology.

FIG. 15 shows a gate controller 32 that may be used as an alternative to the gate controller 30 of FIG. 14B. In this arrangement a signal $S_3$ may be used to control an nMOS transistor 52, similar to the control of the transistor 41 by the signal $S_6$. Signals $S_1$ and $S_2$ may be used to control pMOS transistors 50, 51, similar to the control of the transistor 40 by the signal $S_5$. A gate and a drain of a pMOS transistor 53 may connected between the source of the transistor 51 and the drain of the transistor 50, and a diode may be connected in parallel with the transistor 53.

Figure 16C:
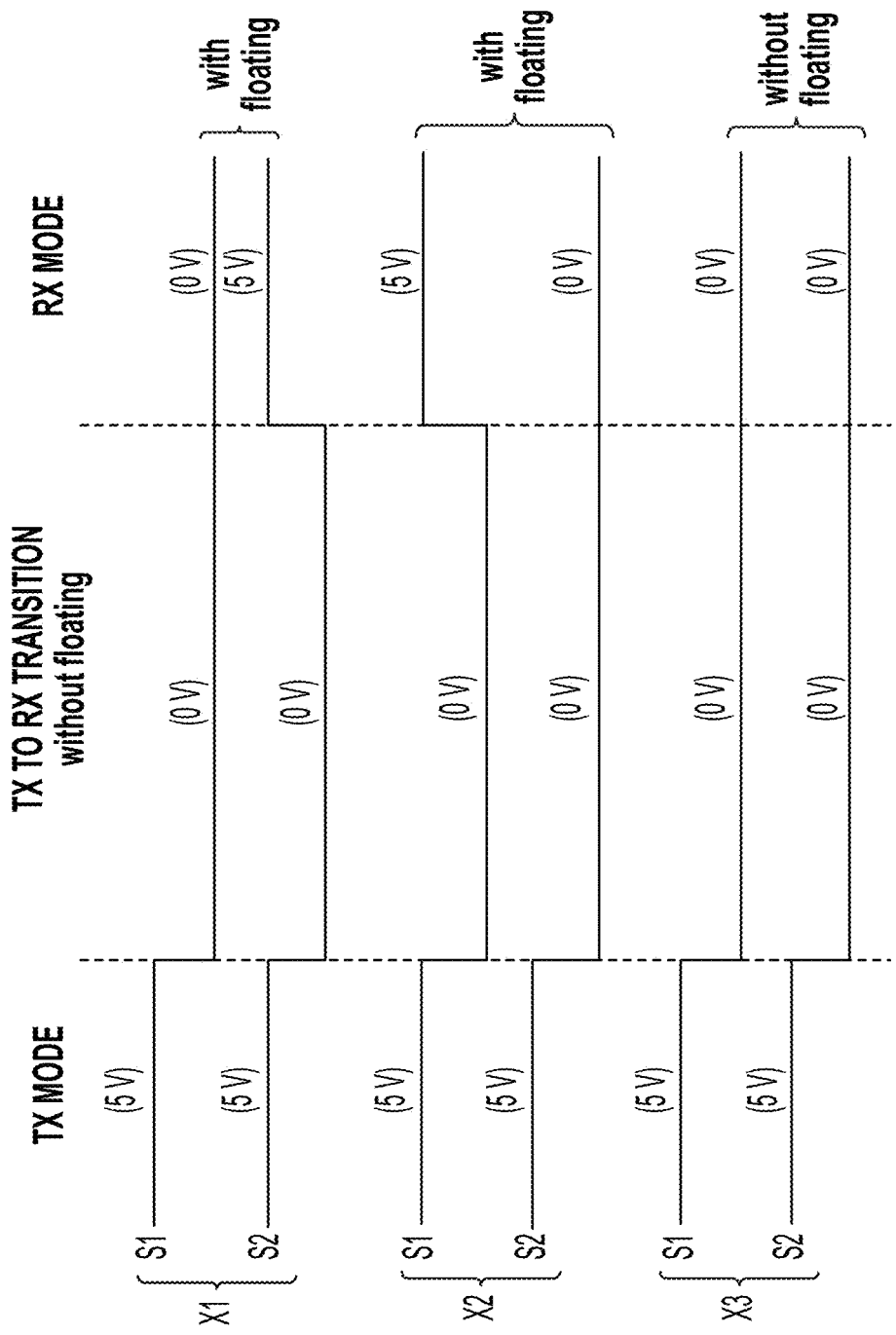
Figure 16D:
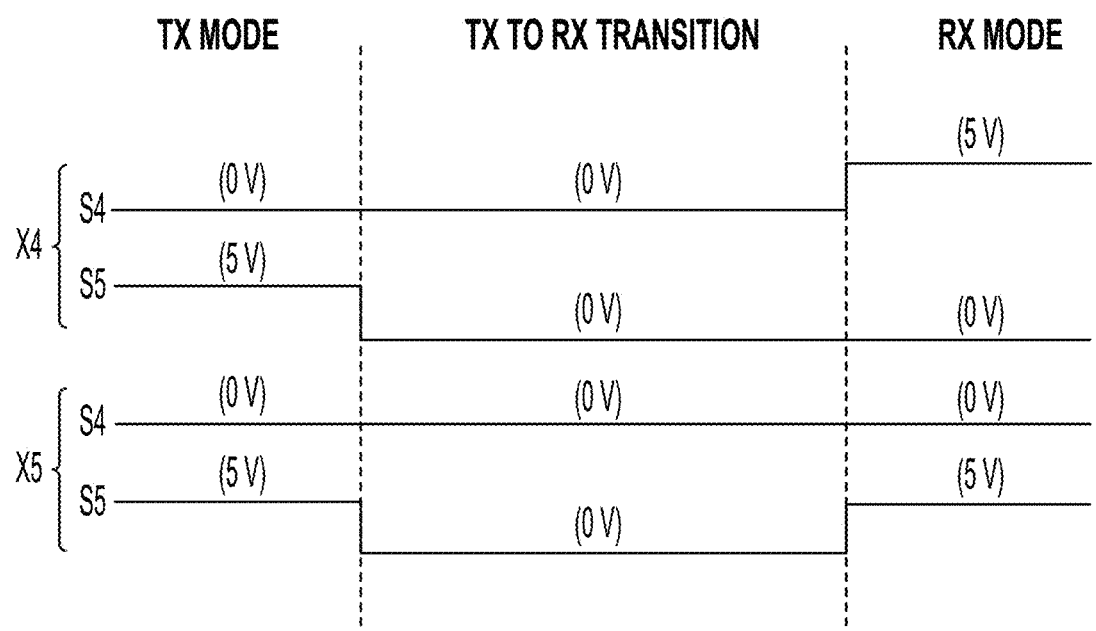

FIGS. 16C and 16D show timing and state diagrams for signaling alternatives X1 through X5 for transitioning from the TX mode to the RX mode. In alternatives X1 and X2, the signals $S_1$ and $S_2$ may not track each other but instead may be different from each other when in the RX mode. In both alternatives X1 and X2, the gates G of the symmetric switch 7 may float at +5 V in the RX mode when the signal $S_1$ is held at 0 V while the signal $S_2$ is at the floating potential of +5 V (alternative X1), or when the signal $S_1$ is at the floating potential of +5V while the signal $S_2$ is held at 0 V (alternative X2). In the alternative X3, the gates G of the symmetric switch 7 may not float in the RX mode but instead may be held at +5 V; in this case, the signals $S_1$ and $S_2$ may track each other and may be held at 0 V in the RX mode.

In the alternative X4, the signal $S_5$ may be held at 0 V while the signal $S_4$ may be at 5 V, in which case the gates G of the symmetric switch 7 may not float in the RX mode but the HV n-well switch 23 may float in the RX mode. In the alternative X5, the signal $S_4$ may be held at 0 V while the signal $S_5$ may be at 5 V, in which case the HV n-well switch 23 may not float in the RX mode but the gates G of the symmetric switch 7 may float in the RX mode.

As will be appreciated, the aspects of the present technology discussed above may provide one or more benefits, some of which may have been mentioned or described above. Described below are examples of such benefits. It should be appreciated that not all aspects of the present technology necessarily provide all of the benefits described herein. Further, it should be appreciated that aspects of the present technology may provide other benefits in addition to those described herein. Furthermore, the examples presented herein are provided for purposes of illustration and are non-limiting examples.

Aspects of the present technology provide circuitry for a pulsing circuit configured to generate bipolar pulses that may be received by a CUT of an ultrasound device without saturating a receiving circuit of the ultrasound device. The circuitry may enable the receiving circuit, which may comprise components not designed to withstand large positive and negative voltage signals associated with the bipolar pulses, to avoid damage when the bipolar pulses are present Aspects of the present application provide symmetric switches configured to decouple the receiving circuit from the transmitting circuit, during a transmit mode, thus preventing damage to the receiving circuit caused by bipolar pulses.

The generation of time-domain and space-domain apodized pulses may require the ability to control multi-level pulses. Aspects of the present technology may provide a feedback circuit configured to perform time-domain and space-domain apodization without resorting to use of additional supply voltages, which if used could undesirably increase the size of ultrasound probes intended to be handheld probes.

An apparatus according to the technology described herein may be embodied in different configurations. Example configurations include combinations of configurations (1) through (2), as follows:

(1) An apparatus comprising an array of symmetric receiver switches coupled between a receiving apparatus and an array of ultrasonic transducers, wherein: a first symmetric receiver switch of the array of symmetric receiver switches is comprised of a first transistor having a first gate, a first source, a first body, and a first drain, and a second transistor having a second gate, a second source, a second body, and a second drain, with the first and second gates coupled to each other, and with the first and second sources coupled to each other, the first drain is connected to a first ultrasonic transducer of the array, the second drain is connected to the receiving apparatus, during a pulse transmission (TX) mode of the apparatus, the first and second gates and the first and second sources are at a same electric potential, and, during a reception (RX) mode of the apparatus: the first and second gates are at a first floating electric potential, or the first and second bodies are at the first floating potential, or the first and second gates and the first and second bodies are at the first floating potential.

(2) The apparatus of configuration (1), wherein, during the TX mode, the first and second bodies are at the same electric potential as the first and second sources.

(3) The apparatus of any one of configurations (1) through (2), wherein, during the RX mode, the first and second bodies are at a second floating electric potential.

(4) The apparatus of any one of configurations (1) through (3), wherein: the first drain is coupled to an input terminal of the first symmetric receiver switch, the second drain is coupled to an output terminal of the first symmetric receiver switch, and, during the TX mode, the second drain is at a fixed potential.

(5) The apparatus of any one of configurations (1) through (4), wherein: the first transistor is an nMOS transistor, the second transistor is an nMOS transistor, and, during the TX mode, the second drain is at an electric potential higher than the first floating potential.

(6) The apparatus of any one of configurations (1) through (5), wherein: the first transistor is a pMOS transistor, the second transistor is a pMOS transistor, and, during the TX mode, the second drain is at an electric potential lower than the first floating potential.

(7) The apparatus of any one of configurations (1) through (6), wherein: the first drain is coupled to an input terminal of the first symmetric receiver switch, the second drain is coupled to an output terminal of the first symmetric receiver switch, and, during the TX mode, the second drain is at ground potential.

(8) The apparatus of any one of configurations (1) through (7), wherein, during the TX mode: the first and second transistors are off, and the same electric potential of the first and second gates and the first and second sources is a negative electric potential.

(9) The apparatus of any one of configurations (1) through (8), wherein, during the TX mode, the first and second bodies are at the negative electric potential of the first and second gates and the first and second sources.

(10) The apparatus of any one of configurations (1) through (9), wherein the negative electric potential is in a range of: −1 V to −100 V, or −5 V to −20 V, or −10 V to −50 V, or −15 V to −75 V.

(11) The apparatus of any one of configurations (1) through (10), wherein, during the TX mode: the first and second transistors are off, and the same electric potential of the first and second gates and the first and second sources is a positive electric potential.

(12) The apparatus of any one of configurations (1) through (11), wherein, during the TX mode, the first and second bodies are at the positive electric potential of the first and second gates and the first and second sources.

(13) The apparatus of any one of configurations (1) through (12), wherein the positive electric potential is in a range of: 1 V to 100 V, or 5 V to 20 V, or 10 V to 50 V, or 15 V to 75 V.

(14) The apparatus of any one of configurations (1) through (13), wherein, during the RX mode, the first and second transistors are on.

(15) The apparatus of any one of configurations (1) through (14), wherein: the first and second transistors are nMOS transistors, and, during the RX mode, the first floating potential of the first and second gates is a positive electric potential.

(16) The apparatus of any one of configurations (1) through (15), wherein the first and second gates are selectively connected to and disconnected from a positive voltage source to set the first floating potential.

(17) The apparatus of any one of configurations (14) through (16), wherein the positive electric potential is in a range of: 1 V to 100 V, or 5 V to 20 V, or 10 V to 50 V, or 15 V to 75 V.

(18) The apparatus of any one of configurations (1) through (17), wherein: the first and second transistors are pMOS transistors, and, during the RX mode, the first floating potential of the first and second gates is a negative electric potential.

(19) The apparatus of any one of configurations (1) through (18), wherein the first and second gates are selectively connected to and disconnected from a negative voltage source to set the first floating potential.

(20) The apparatus of any one of configurations (11) through (19), wherein the negative electric potential is in a range of: −1 V to −100 V, or −5 V to −20 V, or −10 V to −50 V, or −15 V to −75 V.

An apparatus according to the technology described herein may be embodied in different configurations. Example configurations include combinations of configurations (21) through (34), as follows:

(21) An apparatus comprising an array of symmetric receiver switches coupled between a receiving apparatus and an array of ultrasonic transducers, wherein a first symmetric receiver switch of the array of symmetric receiver switches is comprised of a first transistor comprising a first gate and a first source, and a second transistor comprising a second gate and a second source, with the first and second gates coupled to each other, and with the first and second sources coupled to each other, wherein, during a pulse transmit (TX) mode of the apparatus, the first symmetric receiver switch is off, and wherein, during a receive (RX) mode of the apparatus, the first symmetric receiver switch is on.

(22) The apparatus of configuration (21), wherein, during the TX mode, the first and second gates and the first and second sources are at a same electric potential.

(23) The apparatus of any one of configurations (21) through (22), wherein: the first transistor is further comprised of a first body, the second transistor is further comprised of a second body, and, during the TX mode, the first and second gates, the first and second sources, and the first and second bodies are at a same electric potential.

(24) The apparatus of any one of configurations (21) through (23), wherein, during the RX mode, the first and second gates are at a floating potential.

(25) The apparatus of any one of configurations (21) through (24), wherein: the first transistor is further comprised of a first body, the second transistor is further comprised of a second body, and, during the RX mode, the first and second bodies are at a floating potential.

(26) The apparatus of any one of configurations (21) through (25), wherein: the first transistor is further comprised of a first body, the second transistor is further comprised of a second body, and, during the RX mode, the first and second bodies and the first and second gates are at a floating potential.

(27) The apparatus of any one of configurations (21) through (26), wherein: the first transistor is further comprised of a first body, the second transistor is further comprised of a second body, and, during the TX mode, the first and second bodies and the first and second sources are at a same electric potential.

(28) The apparatus of any one of configurations (21) through (27), wherein: the first transistor is further comprised of a first body, the second transistor is further comprised of a second body, and, during the RX mode, the first and second bodies are at a same electric potential.

(29) The apparatus of any one of configurations (21) through (28), wherein, during the RX mode, the first and second bodies are at ground potential.

(30) The apparatus of any one of configurations (21) through (29), wherein, during the RX mode, the first and second bodies are at a floating potential.

(31) The apparatus of any one of configurations (21) through (30), wherein, during the RX mode, the first and second bodies and the first and second sources are at a same electric potential.

(32) The apparatus of any one of configurations (21) through (31), wherein: the first transistor is an nMOS transistor and is further comprised of a first body, the second transistor is an nMOS transistor and is further comprised of a second body, and, during the RX mode, the first and second bodies are at an electric potential lower than the floating electric potential of the first and second gates.

(33) The apparatus of any one of configurations (21) through (32), wherein: the first transistor is a pMOS transistor and is further comprised of a first body, the second transistor is a pMOS transistor and is further comprised of a second body, and, during the RX mode, the first and second bodies are at an electric potential higher than the floating electric potential of the first and second gates.

(34) The apparatus of any one of configurations (21) through (33), wherein: the first transistor is further comprised of a first drain connected to an ultrasonic transducer of the array, and the second transistor is further comprised of a second drain connected to the receiving apparatus.

An ultrasound device according to the technology described herein may be embodied in different configurations. Example configurations include combinations of configurations (35) through (48), as follows:

(35) An ultrasound device comprising: an array of ultrasonic transducers; a receiving apparatus configured to process electrical signals output from the array of ultrasonic transducers; and an array of symmetric switches coupled between the receiving apparatus and the array of ultrasonic transducers, wherein a first symmetric switch of the array of symmetric switches is comprised of a first transistor comprising a first gate and a first source, and a second transistor comprising a second gate and a second source, with the first and second gates coupled to each other, and with the first and second sources coupled to each other, wherein, during a pulse transmit (TX) mode of the device, the first symmetric switch is off, and wherein, during a receive (RX) mode of the device, the first symmetric switch is on.

(36) The ultrasound device of configuration (35), wherein, during the TX mode, the first and second gates and the first and second sources are at a same electric potential.

(37) The ultrasound device of any one of configurations (35) through (36), wherein: the first transistor is further comprised of a first body, the second transistor is further comprised of a second body, and, during the TX mode, the first and second gates, the first and second sources, and the first and second bodies are at a same electric potential.

(38) The ultrasound device of any one of configurations (35) through (37), wherein, during the RX mode, the first and second gates are at a floating potential.

(39) The ultrasound device of any one of configurations (35) through (38), wherein: the first transistor is further comprised of a first body, the second transistor is further comprised of a second body, and, during the RX mode, the first and second bodies are at a floating potential.

(40) The ultrasound device of any one of configurations (35) through (39), wherein: the first transistor is further comprised of a first body, the second transistor is further comprised of a second body, and, during the RX mode, the first and second bodies and the first and second gates are at a floating potential.

(41) The ultrasound device of any one of configurations (35) through (40), wherein: the first transistor is further comprised of a first body, the second transistor is further comprised of a second body, and, during the TX mode, the first and second bodies and the first and second sources are at a same electric potential.

(42) The ultrasound device of any one of configurations (35) through (41), wherein: the first transistor is further comprised of a first body, the second transistor is further comprised of a second body, and, during the RX mode, the first and second bodies are at a same electric potential.

(43) The ultrasound device of any one of configurations (35) through (42), wherein, during the RX mode, the first and second bodies are at ground potential.

(44) The ultrasound device of any one of configurations (35) through (43), wherein, during the RX mode, the first and second bodies are at a floating potential.

(45) The ultrasound device of any one of configurations (35) through (44), wherein, during the RX mode, the first and second bodies and the first and second sources are at a same electric potential.

(46) The ultrasound device of any one of configurations (35) through (45), wherein: the first transistor is an nMOS transistor and is further comprised of a first body, the second transistor is an nMOS transistor and is further comprised of a second body, and, during the RX mode, the first and second bodies are at an electric potential lower than the floating electric potential of the first and second gates.

(47) The ultrasound device of any one of configurations (35) through (46), wherein: the first transistor is a pMOS transistor and is further comprised of a first body, the second transistor is a pMOS transistor and is further comprised of a second body, and, during the RX mode, the first and second bodies are at an electric potential higher than the floating electric potential of the first and second gates.

(48) The ultrasound device of any one of configurations (35) through (47), wherein: the first transistor is further comprised of a first drain connected to an ultrasonic transducer of the array, and the second transistor is further comprised of a second drain connected to the receiving apparatus.

An ultrasound device according to the technology described herein may be embodied in different configurations. Example configurations include combinations of configurations (49) through (62), as follows:

(49) An ultrasound device comprising: an ultrasonic transducer; a receiving apparatus configured to process an electrical signal output from the ultrasonic transducer; and a symmetric switch having an input terminal coupled the ultrasonic transducer and an output terminal coupled to the receiving apparatus, wherein the symmetric switch is comprised of a first transistor comprising a first gate and a first source, and a second transistor comprising a second gate and a second source, with the first and second gates coupled to each other, and with the first and second sources coupled to each other, wherein, during a pulse transmit (TX) mode of the device, the symmetric switch is off, and wherein, during a receive (RX) mode of the device, the symmetric switch is on.

(50) The ultrasound device of configuration (49), wherein, during the TX mode, the first and second gates and the first and second sources are at a same electric potential.

(51) The ultrasound device of any one of configurations (49) through (50), wherein: the first transistor is further comprised of a first body, the second transistor is further comprised of a second body, and, during the TX mode, the first and second gates, the first and second sources, and the first and second bodies are at a same electric potential.

(52) The ultrasound device of any one of configurations (49) through (51), wherein, during the RX mode, the first and second gates are at a floating potential.

(53) The ultrasound device of any one of configurations (49) through (52), wherein: the first transistor is further comprised of a first body, the second transistor is further comprised of a second body, and, during the RX mode, the first and second bodies are at a floating potential.

(54) The ultrasound device of any one of configurations (49) through (53), wherein: the first transistor is further comprised of a first body, the second transistor is further comprised of a second body, and, during the RX mode, the first and second bodies and the first and second gates are at a floating potential.

(55) The ultrasound device of any one of configurations (49) through (54), wherein: the first transistor is further comprised of a first body, the second transistor is further comprised of a second body, and, during the TX mode, the first and second bodies and the first and second sources are at a same electric potential.

(56) The ultrasound device of any one of configurations (49) through (55), wherein: the first transistor is further comprised of a first body, the second transistor is further comprised of a second body, and, during the RX mode, the first and second bodies are at a same electric potential.

(57) The ultrasound device of any one of configurations (49) through (56), wherein, during the RX mode, the first and second bodies are at ground potential.

(58) The ultrasound device of any one of configurations (49) through (57), wherein, during the RX mode, the first and second bodies are at a floating potential.

(59) The ultrasound device of any one of configurations (49) through (58), wherein, during the RX mode, the first and second bodies and the first and second sources are at a same electric potential.

(60) The ultrasound device of any one of configurations (49) through (59), wherein: the first transistor is an nMOS transistor and is further comprised of a first body, the second transistor is an nMOS transistor and is further comprised of a second body, and, during the RX mode, the first and second bodies are at an electric potential lower than the floating electric potential of the first and second gates.

(61) The ultrasound device of any one of configurations (49) through (60), wherein: the first transistor is a pMOS transistor and is further comprised of a first body, the second transistor is a pMOS transistor and is further comprised of a second body, and, during the RX mode, the first and second bodies are at an electric potential higher than the floating electric potential of the first and second gates.

(62) The ultrasound device of any one of configurations (49) through (61), wherein: the first transistor is further comprised of a first drain connected to an ultrasonic transducer of the array, and the second transistor is further comprised of a second drain connected to the receiving apparatus.

An ultrasound device according to the technology described herein may be embodied in different configurations. Example configurations include combinations of configurations (63) through (82), as follows:

(63) An ultrasound device comprising: an array of ultrasonic transducers; a receiving apparatus configured to process electrical signals output from the array of ultrasonic transducers; and an array of symmetric switches coupled between the receiving apparatus and the array of ultrasonic transducers, wherein a first symmetric switch of the array of symmetric switches is comprised of a first transistor having a first gate, a first source, a first body, and a first drain, and a second transistor having a second gate, a second source, a second body, and a second drain, with the first and second gates coupled to each other, and with the first and second sources coupled to each other, wherein the first drain is connected to a first ultrasonic transducer of the array, wherein the second drain is connected to the receiving apparatus, wherein, during a pulse transmission (TX) mode of the device, the first and second gates and the first and second sources are at a same electric potential, and, wherein, during a reception (RX) mode of the device: the first and second gates are at a first floating electric potential, or the first and second bodies are at the first floating potential, or the first and second gates and the first and second bodies are at the first floating potential.

(64) The ultrasound device of configuration (63), wherein, during the TX mode, the first and second bodies are at the same electric potential as the first and second sources.

(65) The ultrasound device of any one of configurations (63) through (64), wherein, during the RX mode, the first and second bodies are at a second floating electric potential.

(66) The ultrasound device of any one of configurations (63) through (65), wherein: the first drain is coupled to an input terminal of the first symmetric receiver switch, the second drain is coupled to an output terminal of the first symmetric receiver switch, and, during the TX mode, the second drain is at a fixed potential.

(67) The ultrasound device of any one of configurations (63) through (66), wherein: the first transistor is an nMOS transistor, the second transistor is an nMOS transistor, and, during the TX mode, the second drain is at an electric potential higher than the first floating potential.

(68) The ultrasound device of any one of configurations (63) through (67), wherein: the first transistor is a pMOS transistor, the second transistor is a pMOS transistor, and, during the TX mode, the second drain is at an electric potential lower than the first floating potential.

(69) The ultrasound device of any one of configurations (63) through (68), wherein: the first drain is coupled to an input terminal of the first symmetric receiver switch, the second drain is coupled to an output terminal of the first symmetric receiver switch, and, during the TX mode, the second drain is at ground potential.

(70) The ultrasound device of any one of configurations (63) through (69), wherein, during the TX mode: the first and second transistors are off, and the same electric potential of the first and second gates and the first and second sources is a negative electric potential.

(71) The ultrasound device of any one of configurations (63) through (70), wherein, during the TX mode, the first and second bodies are at the negative electric potential of the first and second gates and the first and second sources.

(72) The ultrasound device of any one of configurations (63) through (71), wherein the negative electric potential is in a range of: −1 V to −100 V, or −5 V to −20 V, or −10 V to −50 V, or −15 V to −75 V.

(73) The ultrasound device of any one of configurations (63) through (72), wherein, during the TX mode: the first and second transistors are off, and the same electric potential of the first and second gates and the first and second sources is a positive electric potential.

(74) The ultrasound device of any one of configurations (63) through (73), wherein, during the TX mode, the first and second bodies are at the positive electric potential of the first and second gates and the first and second sources.

(75) The ultrasound device of any one of configurations (63) through (74), wherein the positive electric potential is in a range of: 1 V to 100 V, or 5 V to 20 V, or 10 V to 50 V, or 15 V to 75 V.

(76) The ultrasound device of any one of configurations (63) through (75), wherein, during the RX mode, the first and second transistors are on.

(77) The ultrasound device of any one of configurations (63) through (76), wherein: the first and second transistors are nMOS transistors, and, during the RX mode, the first floating potential of the first and second gates is a positive electric potential.

(78) The ultrasound device of any one of configurations (63) through (77), wherein the first and second gates are selectively connected to and disconnected from a positive voltage source to set the first floating potential.

(79) The ultrasound device of any one of configurations (76) through (78), wherein the positive electric potential is in a range of: 1 V to 100 V, or 5 V to 20 V, or 10 V to 50 V, or 15 V to 75 V.

(80) The ultrasound device of any one of configurations (63) through (79), wherein: the first and second transistors are pMOS transistors, and, during the RX mode, the first floating potential of the first and second gates is a negative electric potential.

(81) The ultrasound device of any one of configurations (63) through (80), wherein the first and second gates are selectively connected to and disconnected from a negative voltage source to set the first floating potential.

(82) The ultrasound device of any one of configurations (73) through (81), wherein the negative electric potential is in a range of: −1 V to −100 V, or −5 V to −20 V, or −10 V to −50 V, or −15 V to −75 V.

An ultrasound device according to the technology described herein may be embodied in different configurations. Example configurations include combinations of configurations (83) through (102), as follows:

(83) An ultrasound device comprising: an ultrasonic transducer; a receiving apparatus configured to process an electrical signal output from the ultrasonic transducer; and a symmetric switch having an input terminal coupled the ultrasonic transducer and an output terminal coupled to the receiving apparatus, wherein the symmetric switch is comprised of a first transistor having a first gate, a first source, a first body, and a first drain, and a second transistor having a second gate, a second source, a second body, and a second drain, with the first and second gates coupled to each other, and with the first and second sources coupled to each other, wherein the first drain is connected to a first ultrasonic transducer of the array, wherein the second drain is connected to the receiving apparatus, wherein, during a pulse transmission (TX) mode of the device, the first and second gates and the first and second sources are at a same electric potential, and, wherein, during a reception (RX) mode of the device: the first and second gates are at a first floating electric potential, or the first and second bodies are at the first floating potential, or the first and second gates and the first and second bodies are at the first floating potential.

(84) The ultrasound device of configuration (83), wherein, during the TX mode, the first and second bodies are at the same electric potential as the first and second sources.

(85) The ultrasound device of any one of configurations (83) through (84), wherein, during the RX mode, the first and second bodies are at a second floating electric potential.

(86) The ultrasound device of any one of configurations (83) through (85), wherein: the first drain is coupled to an input terminal of the symmetric switch, the second drain is coupled to an output terminal of the symmetric switch, and, during the TX mode, the second drain is at a fixed potential.

(87) The ultrasound device of any one of configurations (83) through (86), wherein: the first transistor is an nMOS transistor, the second transistor is an nMOS transistor, and, during the TX mode, the second drain is at an electric potential higher than the first floating potential.

(88) The ultrasound device of any one of configurations (83) through (87), wherein: the first transistor is a pMOS transistor, the second transistor is a pMOS transistor, and, during the TX mode, the second drain is at an electric potential lower than the first floating potential.

(89) The ultrasound device of any one of configurations (83) through (88), wherein: the first drain is coupled to an input terminal of the symmetric switch, the second drain is coupled to an output terminal of the symmetric switch, and, during the TX mode, the second drain is at ground potential.

(90) The ultrasound device of any one of configurations (83) through (89), wherein, during the TX mode: the first and second transistors are off, and the same electric potential of the first and second gates and the first and second sources is a negative electric potential.

(91) The ultrasound device of any one of configurations (83) through (90), wherein, during the TX mode, the first and second bodies are at the negative electric potential of the first and second gates and the first and second sources.

(92) The ultrasound device of any one of configurations (83) through (91), wherein the negative electric potential is in a range of: −1 V to −100 V, or −5 V to −20 V, or −10 V to −50 V, or −15 V to −75 V.

(93) The ultrasound device of any one of configurations (83) through (92), wherein, during the TX mode: the first and second transistors are off, and the same electric potential of the first and second gates and the first and second sources is a positive electric potential.

(94) The ultrasound device of any one of configurations (83) through (93), wherein, during the TX mode, the first and second bodies are at the positive electric potential of the first and second gates and the first and second sources.

(95) The ultrasound device of any one of configurations (83) through (94), wherein the positive electric potential is in a range of: 1 V to 100 V, or 5 V to 20 V, or 10 V to 50 V, or 15 V to 75 V.

(96) The ultrasound device of any one of configurations (83) through (95), wherein, during the RX mode, the first and second transistors are on.

(97) The ultrasound device of any one of configurations (83) through (96), wherein: the first and second transistors are nMOS transistors, and, during the RX mode, the first floating potential of the first and second gates is a positive electric potential.

(98) The ultrasound device of any one of configurations (83) through (97), wherein the first and second gates are selectively connected to and disconnected from a positive voltage source to set the first floating potential.

(99) The ultrasound device of any one of configurations (96) through (98), wherein the positive electric potential is in a range of: 1 V to 100 V, or 5 V to 20 V, or 10 V to 50 V, or 15 V to 75 V.

(100) The ultrasound device of any one of configurations (83) through (99), wherein: the first and second transistors are pMOS transistors, and, during the RX mode, the first floating potential of the first and second gates is a negative electric potential.

(101) The ultrasound device of any one of configurations (83) through (100), wherein the first and second gates are selectively connected to and disconnected from a negative voltage source to set the first floating potential.

(102) The ultrasound device of any one of configurations (93) through (101), wherein the negative electric potential is in a range of: −1 V to −100 V, or −5 V to −20 V, or −10 V to −50 V, or −15 V to −75 V.

A method of using an apparatus (e.g., an ultrasound device) according to the technology described herein may include various processes. Example processes include combinations of processes (103) through (115), as follows:

(103) A method of an apparatus having a pulse transmission (TX) mode and a reception (RX) mode, the apparatus comprising an ultrasonic transducer, a receiver configured to process an electrical signal output from the ultrasonic transducer, and a symmetric switch having an input terminal coupled to the ultrasonic transducer and an output terminal coupled to the receiving apparatus, the symmetric switch comprising first and second transistors, the first transistor comprising a first gate, a first source, a first body, and a first drain, the second transistor comprising a second gate, a second source, a second body, and a second drain, wherein the first and second gates are coupled to each other, and wherein the first and second sources coupled to each other, the method comprising: in the TX mode, causing the symmetric switch to be off, and, in the RX mode, causing the symmetric switch to be on.

(104) The method of process (103), wherein, during the TX mode, in the causing of the symmetric switch to be off, the first and second gates and the first and second sources are caused to be at a same electric potential.

(105) The method of any one of processes (103) through (104), wherein, during the TX mode, in the causing of the symmetric switch to be off, the first and second gates, the first and second sources, and the first and second bodies are caused to be at a same electric potential.

(106) The method of any one of processes (103) through (105), wherein, during the RX mode, in the causing of the symmetric switch to be on, the first and second gates are caused to be at a floating potential.

(107) The method of any one of processes (103) through (106), wherein, during the RX mode, in the causing of the symmetric switch to be on, the first and second bodies are caused to be at a floating potential.

(108) The method of any one of processes (103) through (107), wherein, during the RX mode, in the causing of the symmetric switch to be on, the first and second bodies and the first and second gates are caused to be at a floating potential.

(109) The method of any one of processes (103) through (108), during the TX mode, in the causing of the symmetric switch to be off, the first and second bodies and the first and second sources are set to be at a same electric potential.

(110) The method of any one of processes (103) through (109), wherein, during the RX mode, in the causing of the symmetric switch to be on, the first and second bodies are caused to be at a same electric potential.

(111) The method of any one of processes (103) through (110), wherein, during the RX mode, in the causing of the symmetric switch to be on, the first and second bodies are caused to be at ground potential.

(112) The method of any one of processes (103) through (111), wherein, during the RX mode, in the causing of the symmetric switch to be on, the first and second bodies are caused to be at a floating potential.

(113) The method of any one of processes (103) through (112), wherein, during the RX mode, in the causing of the symmetric switch to be on, the first and second bodies and the first and second sources are caused to be at a same electric potential.

(114) The method of any one of processes (103) through (113), wherein: the first transistor is an nMOS transistor, the second transistor is an nMOS transistor, and, during the RX mode, in the causing of the symmetric switch to be on, the first and second bodies are caused to be at an electric potential lower than the floating electric potential of the first and second gates.

(115) The method of any one of processes (103) through (114), wherein: the first transistor is a pMOS transistor, the second transistor is a pMOS transistor, and, during the RX mode, in the causing of the symmetric switch to be on, the first and second bodies are caused to be at an electric potential higher than the floating electric potential of the first and second gates.

A method of using an apparatus (e.g., an ultrasound device) according to the technology described herein may include various processes. Example processes include combinations of processes (116) through (135), as follows:

(116) A method of an apparatus having a pulse transmission (TX) mode and a reception (RX) mode, the apparatus comprising an ultrasonic transducer, a receiver configured to process an electrical signal output from the ultrasonic transducer, and a symmetric switch having an input terminal coupled to the ultrasonic transducer and an output terminal coupled to the receiving apparatus, the symmetric switch comprising first and second transistors, the first transistor comprising a first gate, a first source, a first body, and a first drain, the second transistor comprising a second gate, a second source, a second body, and a second drain, wherein the first and second gates are coupled to each other, and wherein the first and second sources coupled to each other, the method comprising: entering the TX mode by causing the first and second gates and the first and second sources to be at a same electric potential; and entering the RX mode by causing: the first and second gates to be at a first floating electric potential, or the first and second bodies to be at the first floating potential, or the first and second gates and the first and second bodies to be at the first floating potential.

(117) The method of process (116), wherein, in the entering of the TX mode, the first and second bodies are caused to be at the same electric potential as the first and second sources.

(118) The method of any one of processes (116) through (117), wherein, in entering the RX mode, the first and second bodies are caused to be at a second floating electric potential.

(119) The method of any one of processes (116) through (118), wherein, in entering the TX mode, the second drain is caused to be at a fixed potential.

(120) The method of any one of processes (116) through (119), wherein: the first transistor is an nMOS transistor, the second transistor is an nMOS transistor, and, in entering the TX mode, the second drain is caused to be at an electric potential higher than the first floating potential.

(121) The method of any one of processes (116) through (120), wherein: the first transistor is a pMOS transistor, the second transistor is a pMOS transistor, and, in entering the TX mode, the second drain is caused to be at an electric potential lower than the first floating potential.

(122) The method of any one of processes (116) through (121), wherein, in entering the TX mode, the second drain is caused to be at ground potential.

(123) The method of any one of processes (116) through (122), wherein: in entering the TX mode, the first and second transistors are caused to be off, and the same electric potential of the first and second gates and the first and second sources is a negative electric potential.

(124) The method of any one of processes (116) through (123), wherein, in entering the TX mode, the first and second bodies are caused to be at the negative electric potential of the first and second gates and the first and second sources.

(125) The method of any one of processes (116) through (124), wherein the negative electric potential is in a range of: −1 V to −100 V, or −5 V to −20 V, or −10 V to −50 V, or −15 V to −75 V.

(126) The method of any one of processes (116) through (125), wherein: in entering the TX mode, the first and second transistors are caused to be off, and the same electric potential of the first and second gates and the first and second sources is a positive electric potential.

(127) The method of any one of processes (116) through (126), wherein, in entering the TX mode, the first and second bodies are caused to be at the positive electric potential of the first and second gates and the first and second sources.

(128) The method of any one of processes (116) through (127), wherein the positive electric potential is in a range of: 1 V to 100 V, or 5 V to 20 V, or 10 V to 50 V, or 15 V to 75 V.

(129) The method of any one of processes (116) through (128), wherein, in entering the RX mode, the first and second transistors are caused to be on.

(130) The method of any one of processes (116) through (129), wherein: the first and second transistors are nMOS transistors, and, in entering the RX mode, the first floating potential of the first and second gates is set at a positive electric potential.

(131) The method of any one of processes (116) through (130), wherein the first and second gates are selectively connected to and disconnected from a positive voltage source to set the first floating potential.

(132) The method of any one of processes (129) through (131), wherein the positive electric potential is in a range of: 1 V to 100 V, or 5 V to 20 V, or 10 V to 50 V, or 15 V to 75 V.

(133) The method of any one of processes (116) through (132), wherein: the first and second transistors are pMOS transistors, and, in entering the RX mode, the first floating potential of the first and second gates is set at a negative electric potential.

(134) The method of any one of processes (116) through (133), wherein the first and second gates are selectively connected to and disconnected from a negative voltage source to set the first floating potential.

(135) The method of any one of processes (126) through (134), wherein the negative electric potential is in a range of: −1 V to −100 V, or −5 V to −20 V, or −10 V to −50 V, or −15 V to −75 V.

Having thus described several aspects of the present technology, it is to be appreciated that various alterations, modifications, and improvements may readily occur to those of ordinary skill in the art. Such alterations, modifications, and improvements are intended to be within the spirit and scope of the technology described herein. It is, therefore, to be understood that the foregoing descriptions of aspects of the present technology are presented by way of example only and that, within the scope of the appended claims and equivalents thereto, variations of these aspects may be practiced otherwise than as specifically described. In addition, any combination of two or more features, systems, articles, materials, and/or methods described herein, if such features, systems, articles, materials, and/or methods are not mutually inconsistent, is included within the scope of the present disclosure.

Also, as described, some aspects may be embodied as one or more methods. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Features of the aspects and embodiments described above may be used individually, all together, or in any combination of two or more.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

Use of ordinal terms such as "first," "second," "third," etc., in the description and/or the claims to modify a feature does not by itself connote any priority, precedence, or order of one feature over another feature.

The phrase "and/or," as used herein in the specification and in the claims, should be understood to mean "either or both" of the elements so conjoined, i.e., elements that are conjunctively present in some cases and disjunctively present in other cases.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

The terms "approximately" and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value.

In the claims, as well as in the specification above, all transitional phrases such as "comprising," "including," "carrying," "having," "containing," "involving," "holding," "composed of," and the like are to be understood to be open-ended, i.e., to mean including but not limited to. The transitional phrases "consisting of" and "consisting essentially of" shall be closed or semi-closed transitional phrases, respectively.

The invention claimed is:

1. An apparatus, comprising
an array of symmetric receiver switches coupled between a receiving apparatus and an array of ultrasonic transducers,
wherein:
  a first symmetric receiver switch of the array of symmetric receiver switches is comprised of
    a first transistor having a first gate, a first source, a first body, and a first drain, and
    a second transistor having a second gate, a second source, a second body, and a second drain,
    with the first and second gates coupled to each other, and
    with the first and second sources coupled to each other to a drain of a source transistor, and
    with the first and second bodies coupled to each other and to a drain of a body transistor,
    with an electric potential of the first and second sources and an electric potential of the first and second bodies independently configurable by the body and source transistors,
  the first drain is connected to a first ultrasonic transducer of the array of ultrasonic transducers,
  the second drain is connected to the receiving apparatus,
  during a pulse transmission (TX) mode of the apparatus, the body transistor and the source transistor are on to set the first and second gates, the first and second sources, and the first and second bodies at a same electric potential, and,
  during a reception (RX) mode of the apparatus, at least the body transistor is configured such that:
    the first and second gates are at a first floating electric potential, or
    the first and second bodies are at the first floating electric potential, or
    the first and second gates and the first and second bodies are at the first floating electric potential.

2. The apparatus of claim 1,
wherein, during the pulse TX mode, the first and second bodies are at the same electric potential as the first and second sources.

3. The apparatus of claim 1,
wherein, during the RX mode, the first and second bodies are at a second floating electric potential.

4. The apparatus of claim 1,
wherein:
  the first drain is coupled to an input terminal of the first symmetric receiver switch,
  the second drain is coupled to an output terminal of the first symmetric receiver switch, and,
  during the pulse TX mode, the second drain is at a fixed potential.

5. The apparatus of claim 4,
wherein:
  the first transistor is an nMOS transistor,
  the second transistor is an nMOS transistor, and,
  during the pulse TX mode, the second drain is at an electric potential higher than the first floating electric potential.

6. The apparatus of claim 4,
wherein:
  the first transistor is a pMOS transistor,
  the second transistor is a pMOS transistor, and,
  during the pulse TX mode, the second drain is at an electric potential lower than the first floating electric potential.

7. The apparatus of claim 1,
wherein:
  the first drain is coupled to an input terminal of the first symmetric receiver switch,
  the second drain is coupled to an output terminal of the first symmetric receiver switch, and,
  during the pulse TX mode, the second drain is at ground potential.

8. The apparatus of claim 5,
wherein, during the pulse TX mode:
  the first and second transistors are off, and
  the same electric potential of the first and second gates and the first and second sources is a negative electric potential.

9. The apparatus of claim 8,
wherein, during the pulse TX mode, the first and second bodies are at the negative electric potential of the first and second gates and the first and second sources.

10. The apparatus of claim 8,
wherein the negative electric potential is in a range of:
  −1 V to −100 V, or
  −5 V to −20 V, or
  −10 V to −50 V, or
  −15 V to −75 V.

11. The apparatus of claim 6,
wherein, during the pulse TX mode:
  the first and second transistors are off, and
  the same electric potential of the first and second gates and the first and second sources is a positive electric potential.

12. The apparatus of claim 11,
wherein, during the pulse TX mode, the first and second bodies are at the positive electric potential of the first and second gates and the first and second sources.

13. The apparatus of claim 11,
wherein the positive electric potential is in a range of:
   1 V to 100 V, or
   5 V to 20 V, or
   10 V to 50 V, or
   15 V to 75 V.

14. The apparatus of claim 1,
wherein, during the RX mode, the first and second transistors are on.

15. The apparatus of claim 14,
wherein:
   the first and second transistors are nMOS transistors, and,
   during the RX mode, the first floating electric potential of the first and second gates is a positive electric potential.

16. The apparatus of claim 15,
wherein the first and second gates are selectively connected to and disconnected from a positive voltage source to set the first floating electric potential.

17. The apparatus of claim 15,
wherein the positive electric potential is in a range of:
   1 V to 100 V, or
   5 V to 20 V, or
   10 V to 50 V, or
   15 V to 75 V.

18. The apparatus of claim 14,
wherein:
   the first and second transistors are pMOS transistors, and,
   during the RX mode, the first floating electric potential of the first and second gates is a negative electric potential.

19. The apparatus of claim 18,
wherein the first and second gates are selectively connected to and disconnected from a negative voltage source to set the first floating electric potential.

20. The apparatus of claim 18,
wherein the negative electric potential is in a range of:
   −1 V to −100 V, or
   −5 V to −20 V, or
   −10 V to −50 V, or
   −15 V to −75 V.

* * * * *